United States Patent [19]

Oshiage et al.

[11] Patent Number: 4,777,920
[45] Date of Patent: Oct. 18, 1988

[54] SYSTEM FOR CONTROLLING IGNITION TIMING IN AN INTERNAL COMBUSTION ENGINE AND METHOD THEREFOR

[75] Inventors: Katsunori Oshiage; Akito Yamamoto, both of Yokohama; Yuji Nakajima, Yokosuka, all of Japan

[73] Assignee: Nissan Motor Company, Limited, Kanagawa, Japan

[21] Appl. No.: 8,116

[22] Filed: Jan. 23, 1987

Related U.S. Application Data

[63] Continuation of Ser. No. 749,497, Jun. 27, 1985, abandoned.

[30] Foreign Application Priority Data

Jun. 29, 1984 [JP] Japan ................... 59-132992
Jun. 30, 1984 [JP] Japan ................... 59-136703

[51] Int. Cl.$^4$ .............................................. F02P 5/04
[52] U.S. Cl. ..................... 123/425; 123/435; 73/35
[58] Field of Search ............ 123/42 J, 422, 427, 123/416, 435; 73/35

[56] References Cited

U.S. PATENT DOCUMENTS

| | | | |
|---|---|---|---|
| 4,106,447 | 8/1978 | West | 123/117 |
| 4,355,359 | 10/1982 | Kanegae et al. | 364/431.04 |
| 4,368,635 | 1/1983 | Yoshida | 73/35 |
| 4,370,964 | 2/1983 | Muranaka et al. | 123/425 |
| 4,373,489 | 2/1983 | Yamaguchi | 123/422 |
| 4,376,428 | 3/1983 | Hata et al. | 123/417 |
| 4,380,981 | 4/1983 | Enoshima et al. | 123/415 |
| 4,382,429 | 5/1983 | Enoshima et al. | 123/425 |
| 4,393,837 | 7/1983 | Sugihara et al. | 123/425 |
| 4,409,937 | 10/1983 | Asano | 123/425 |
| 4,420,967 | 12/1983 | Enoshima et al. | 73/35 |
| 4,423,621 | 1/1984 | Kenichi | 73/35 |
| 4,425,890 | 1/1984 | Yamaguchi | 123/418 |
| 4,452,204 | 6/1984 | Matsubara | 123/417 |
| 4,455,862 | 6/1984 | Takeuchi | 73/35 |
| 4,463,722 | 8/1984 | Kobayashi | 123/425 |
| 4,481,924 | 11/1984 | Kobayashi | 123/425 |
| 4,513,716 | 4/1985 | Haroguchi et al. | 123/425 |

FOREIGN PATENT DOCUMENTS

| | | |
|---|---|---|
| 53-56429 | 5/1978 | Japan . |
| 54-142425 | 11/1979 | Japan . |
| 56-554 | 1/1981 | Japan . |
| 57-212349 | 12/1982 | Japan . |
| 58-13749 | 3/1983 | Japan . |
| 58-82074 | 5/1983 | Japan . |
| 59-39974 | 3/1984 | Japan . |
| 59-39972 | 3/1984 | Japan . |

*Primary Examiner*—Raymond A. Nelli
*Attorney, Agent, or Firm*—Foley & Lardner, Schwartz, Jeffery, Schwaab, Mack, Blumenthal & Evans

[57] ABSTRACT

A system and method for controlling ignition timing of an internal combustion engine controls the ignition timing in accordance with the measured intensity of knocking when such occurs. The system corrects the ignition timing by a retardation amount related to the intensity of knocking. The system monitors engine vibration over a period in which knocking cannot occur and over the period after TDC in which knocking may occur and compares the vibration intensity levels to produce a statistical measure of knocking intensity. If the measured intensity reflects a high probability of severe knocking, ignition is retarded immediation to an extent related to the measured intensity. If knocking is absent to a high probability, ignition timing is advanced to a fixed extent. When only light knocking is detected, the measured intensity is monitored over numerous ignition cycles until the cumulative intensity level reflects a high probability either of desirable trace knocking or moderately disruptive knocking. In the latter case, ignition is retarded to a fixed extent.

13 Claims, 28 Drawing Sheets

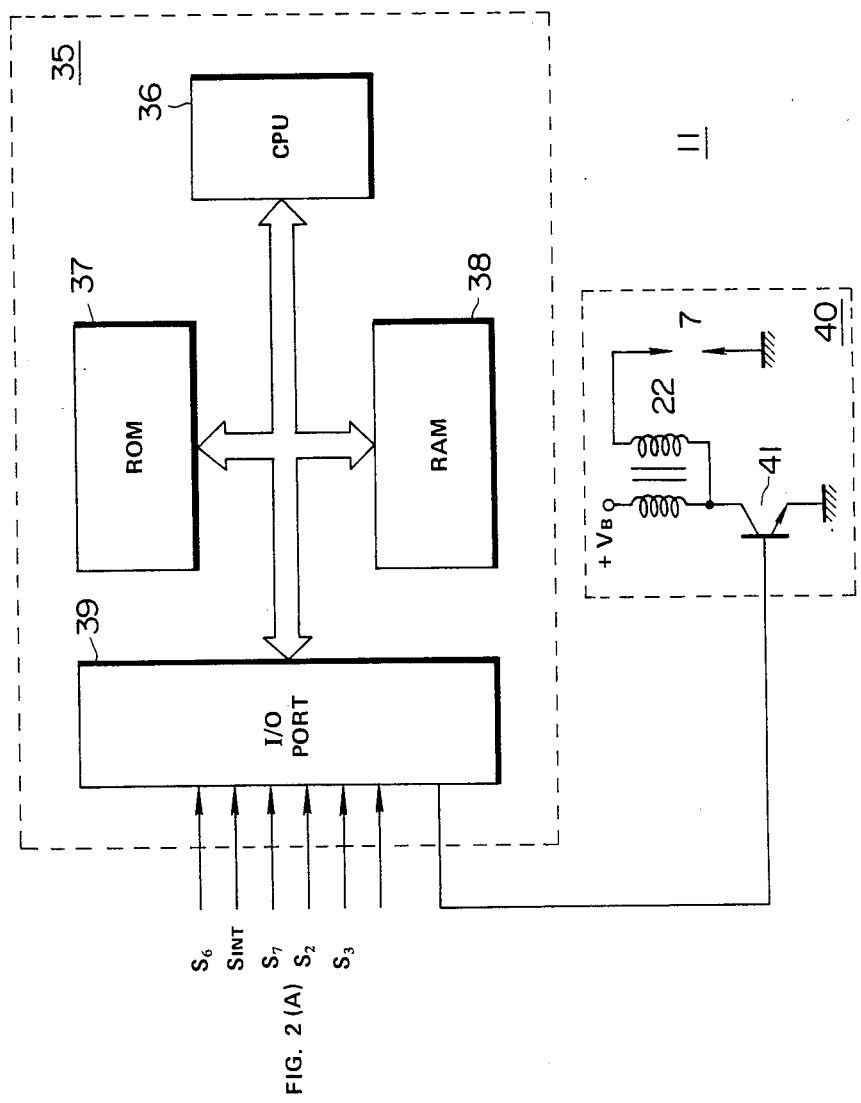

FIG.8
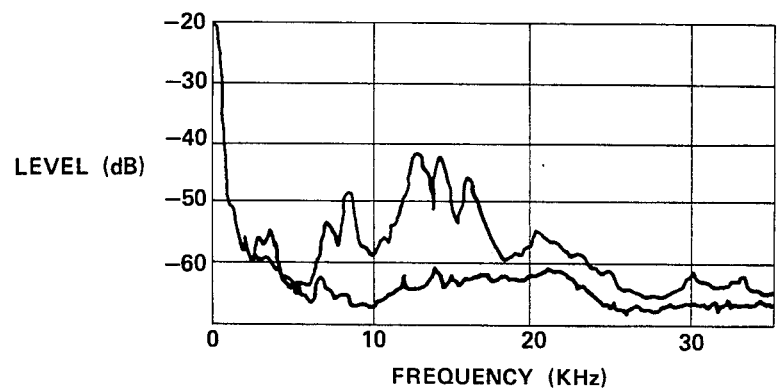
FIG.9 (A)
FIG.9 (B)
FIG.10 (A)
FIG.10 (B)

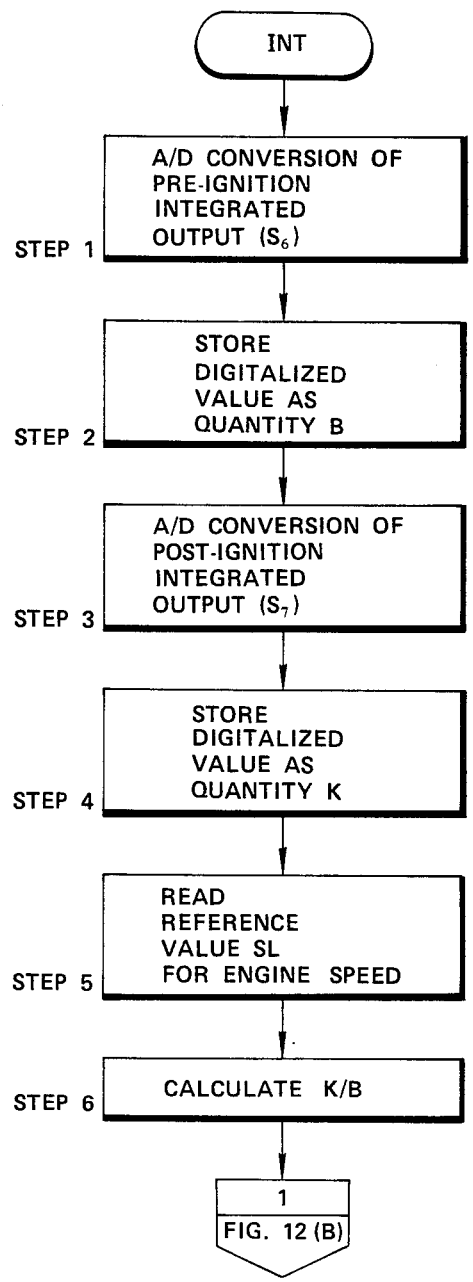

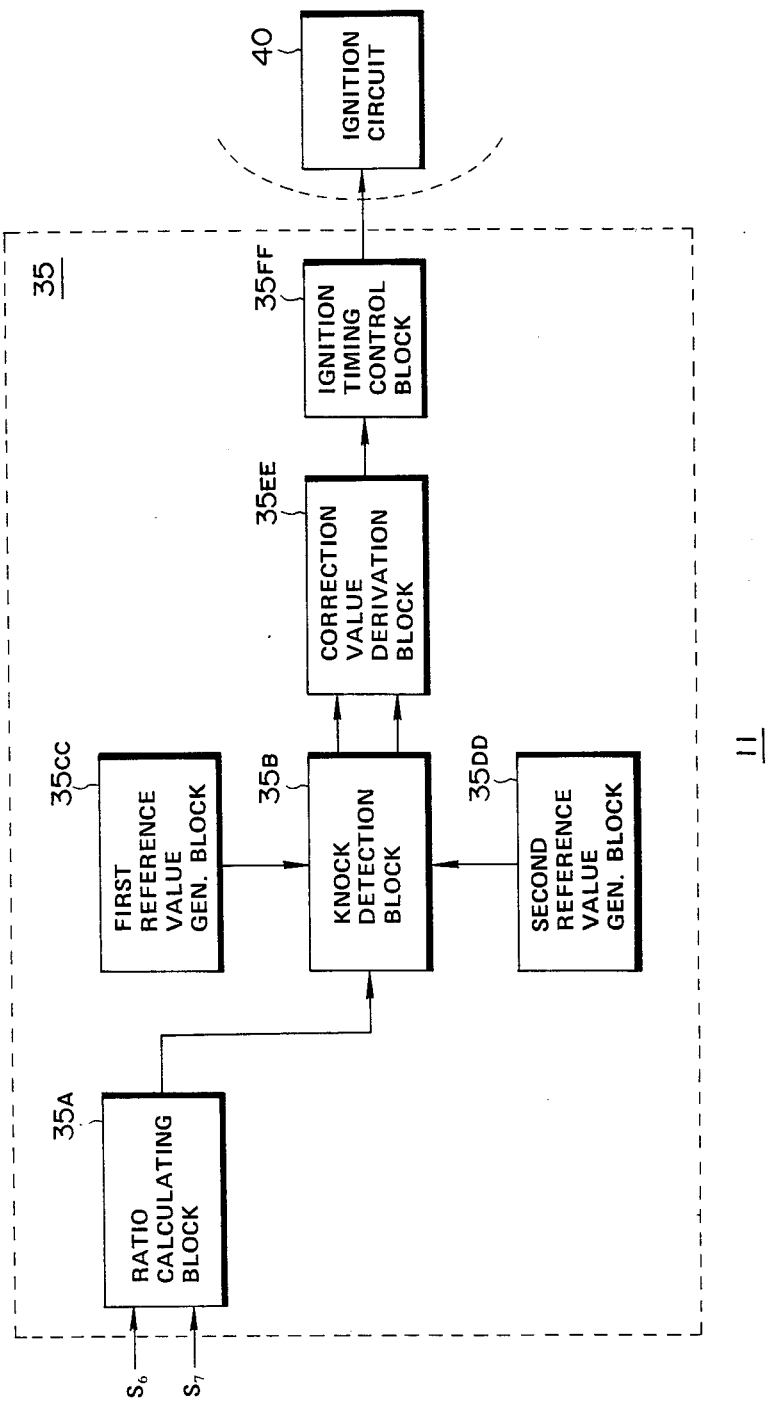

SYSTEM FOR CONTROLLING IGNITION TIMING IN AN INTERNAL COMBUSTION ENGINE AND METHOD THEREFOR

This application is a continuation of application Ser. No. 749,497 filed June 27, 1985, now abandoned.

BACKGROUND OF THE INVENTION

The present invention relates to a system and method for controlling ignition timing in an internal combustion engine on the basis of the degree of engine knocking.

In general, in internal combustion engines, the pressure in combustion chambers (cylinder pressure) has a plurality of inherent resonant frequencies determined by the cylinder's dimensions (especially cylinder bore inner diameter). The damped pressure often causes the internal combustion engine to emit metallic rattling noise, i.e., knocking.

Various systems for the internal combustion engines have been proposed to eliminate knocking by controlling ignition timing.

Such systems are exemplified by Japanese Patent Applications Unexamined Open No. Sho. 54-142,425, Sho. 56-000,554, etc.

Such conventional systems extract accoustical signal components in a particular frequency band (above about 5 or 6 kilohertz) characteristic of knocking from among acoustical signals from a knocking sensor, such as a pressure sensitive sensor attached to a cylinder block or a washer for one of the spark plugs of the engine. The conventional systems then process the extracted signal, produce a detection signal corresponding to a combustion pressure vibration of the engine, determine the presence or absence of the occurrence of knocking by comparing the produced detection signal to a previously set reference level, and retard the ignition timing by a predetermined value of angle when the comparison indicates the presence of knocking.

However, there are drawbacks in the conventional systems disclosed in the above-identified documents as described below.

However, in systems such as described above, the relationship between the magnitude (level) of knocking and ignition timing changes with engine operating conditions which may at times lead to wasteful fuel consumption and to a reduction in engine output torque due to excessive retardation of the ignition timing when the knocking is relatively weak. In addition, the fixed rate of ignition retardation may not be sufficient to quickly suppress severe knocking. On the other hand, the fixed retardation will be excessive for weaking knocking, resulting in unnecessary loss of engine torque.

SUMMARY OF THE INVENTION

With the above-described drawbacks in mind, it is an object of the present invention to provide a system and method for controlling the ignition timing of the internal combustion engine which controls the ignition timing accurately according to the degree of knocking when knocking is detected so that the knocking can be suppressed quickly without sacrificing engine performance.

It is another object of the present invention to provide the system and method for controlling the ignition timing of the engine which controls the ignition timing accurately according to the degree of knocking, the correction to ignition timing being adjusted in accordance with the peak knocking frequency when weak knocking is detected and in accordance with knocking intensity when severe knocking is detected.

The above objects can be achieved by providing a system for controlling the ignition timing of the engine which comprises: (a) first means for detecting the occurrence of engine knocking, (b) second means for measuring the intensity of knocking when the second means detects engine knocking, and (c) third means for retarding ignition advance angle value according to the intensity of the engine knocking detected by the second means.

BRIEF DESCRIPTION OF THE DRAWINGS

A more complete understanding of the present invention may be obtained from the following detailed description taken in conjunction with the attached drawings in which like reference numerals designate corresponding elements and in which:

FIGS. 2(A) and 2(B) are an simplified circuit block diagram of a control unit shown in FIG. 1;

FIG. 8 show acoustical power spectra both during knocking and during normal combustion;

FIGS. 9(A), 9(B), 10(A), and 10(B) are waveform charts for use in explaining how to detect knocking;

FIGS. 12(A), 12(B), and 12(C) are a processing flowchart executed by a main control circuit for detecting knocking and deriving the correction to ignition timing;

FIGS. 19(A) and 19(B) are another functional block diagram of the control unit shown in FIG. 1;

DETAILED DESCRIPTION OF THE PREFERRED EMBODIMENTS

Reference will be made to the drawings in order to facilitate understanding of the present invention.

Figure 1:
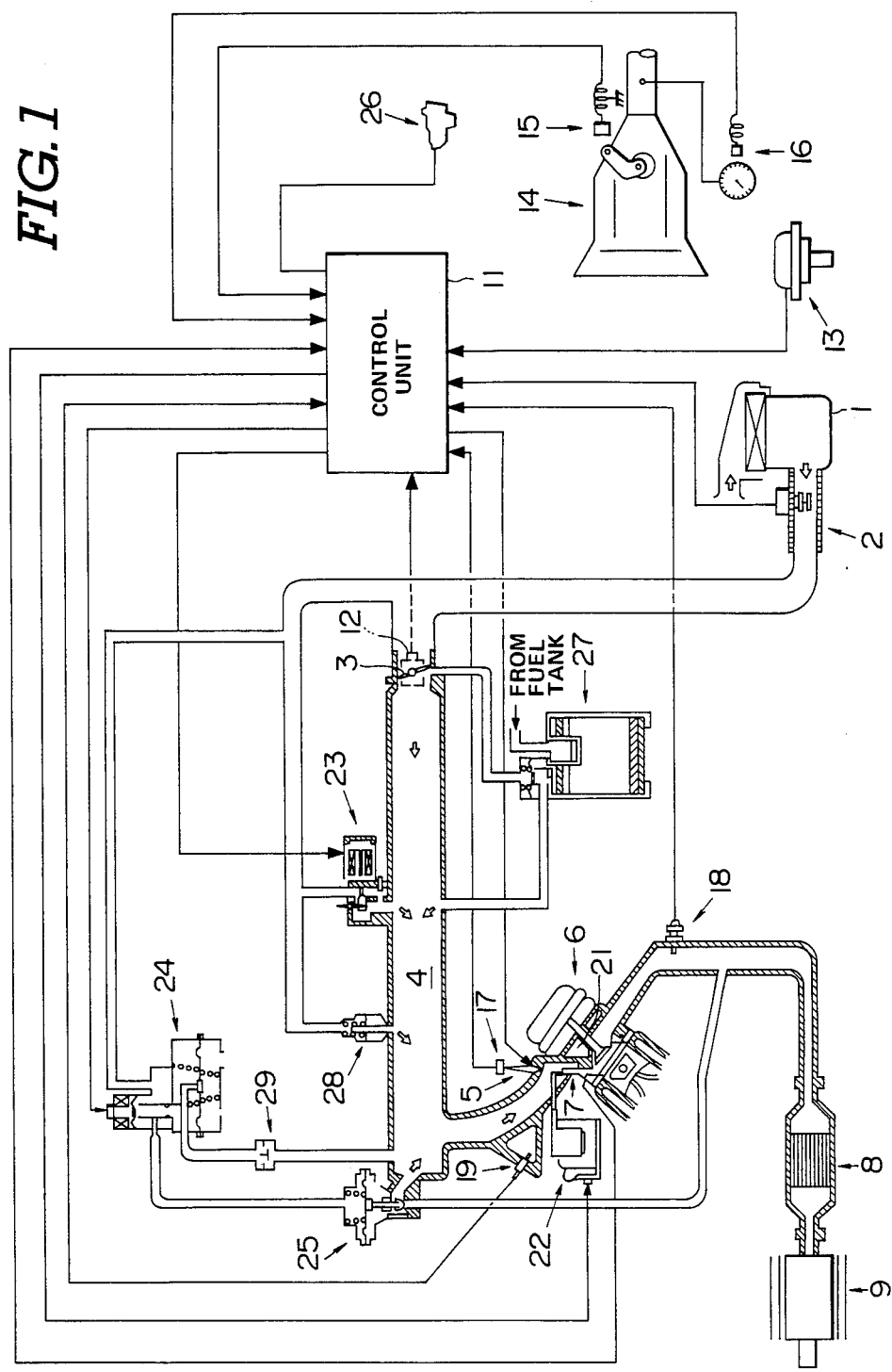
FIG. 1 is a schematic diagram of a first preferred embodiment of the system for controlling the ignition timing of the internal combustion engine according to the present invention.

FIG. 1 shows a general engine control apparatus to which the system for controlling the ignition timing of the engine according to the present invention is applicable.

In the internal combustion engine of an automotive vehicle to which the present invention is applicable, a given amount of intake air drawn into an intake manifold 4 via air cleaner 1, airflow meter 2, and throttle valve 3 and a given amount of fuel supplied by means of a fuel injector 5 are mixed and drawn into an engine combustion chamber 6. The air-mixture fuel is then ignited by means of a spark plug 7 and burned. The exhaust generated by combustion of the fuel mixture is vented via an exhaust manifold, catalytic converter 8 and muffler 9.

A control unit 11 for performing general engine operation control receives various signals; an intake air flow rate signal from an airflow meter 2, a throttle valve position signal from a throttle switch 12 which detects when a throttle valve 3 is wide open, an engine revolution speed signal from a crank angle sensor 13; a neutral gear position signal from a neutral switch 15 which detects the neutral position of a power transmission 14, and a vehicle speed signal from a vehicle speed sensor 16.

In addition, the control unit 11 receives a fuel temperature signal from a fuel temperature sensor 17 which monitors fuel temperature, an oxygen concentration signal from an oxygen ($O_2$) sensor 18 which monitors the concentration of oxygen in exhaust gas, a cooling water temperature signal from a cooling water temperature sensor 19 which monitors an engine cooling water temperature, a cylinder pressure signal from an cylinder pressure sensor 21 which monitors combustion pressure. The control unit 11 controls the amount of fuel supplied to the engine via numerous fuel injectors 5 and the timing of ignition of the fuel mixture drawn into each cylinder by the corresponding spark plug 7. Specifically, the spark plug 7 is, for example, connected to a secondary winding of an ignition coil via a distributor. When a primary current of the ignition coil is interrupted by the distributor, the corresponding spark plug generates a spark discharge due to the high-surge voltage generated across the secondary winding so that the fuel mixture fuel near the spark plug is ignited. The term of ignition timing means the timing at which the control unit 11 sends a signal to interrupt the primary current of the ignition coil relative to the angular position of an engine crankshaft.

In addition, the control unit 11 controls the idling engine speed by controlling the amount of air passing through a bypass via an Auxiliary Air Control (AAC) valve 23 and controls the rate of Exhaust Gas Recirculation (EGR) by controlling the flow cross-section of an EGR valve 25 via a on-and-off controlled VCM (Vacuum Control Modulator) valve 24.

It should noted that in FIG. 1, numeral 26 denotes a fuel pump, numeral 27 denotes a vapor-control canister, numeral 28 denotes a BC valve, and numeral 29 denotes a check valve.

Figure 2A:
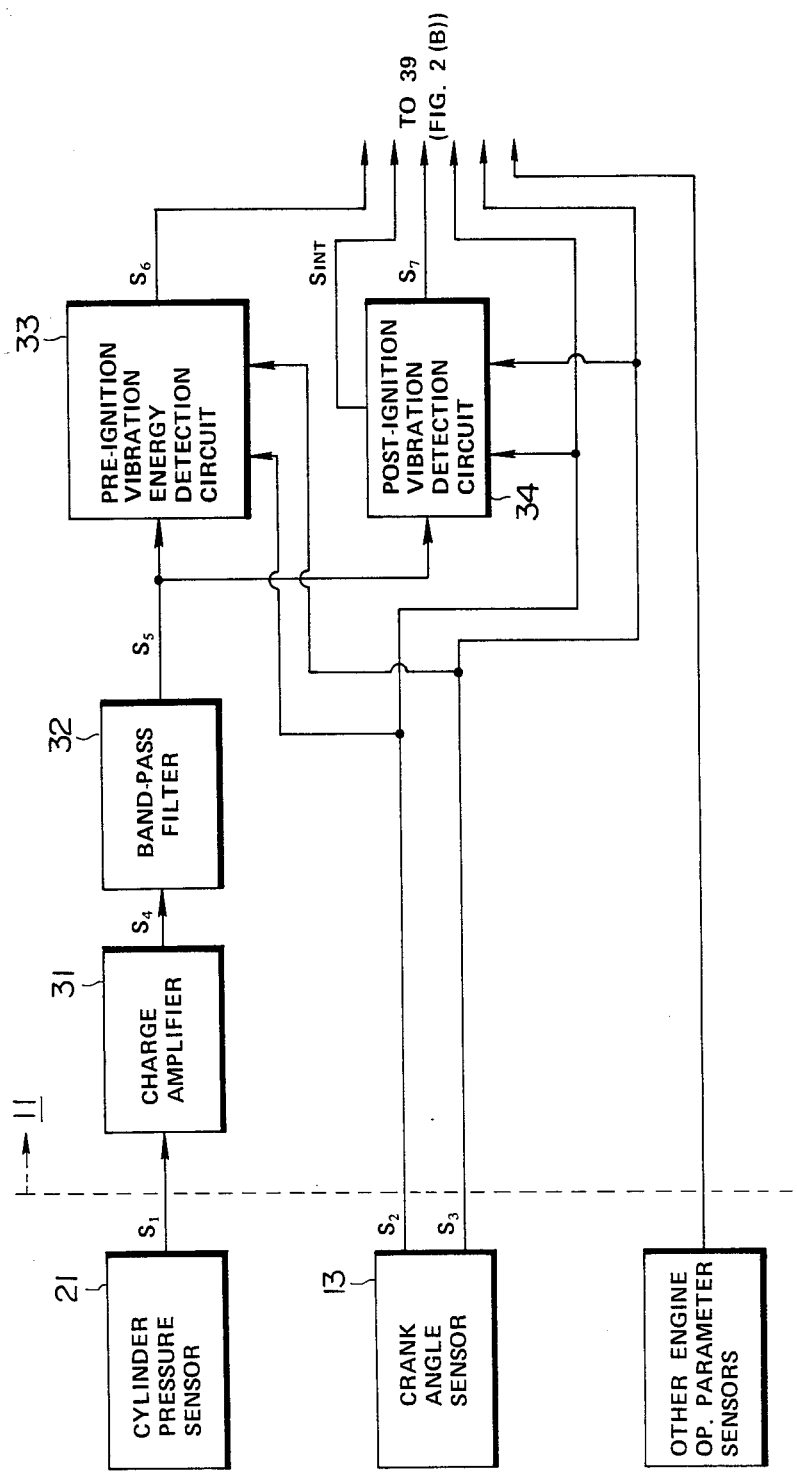

FIGS. 2(A) and (B) and FIG. 3 are circuit block and functional block diagrams respectively for the control unit 11 of a first preferred embodiment.

The crank angle sensor 13 outputs a reference signal $S_2$ whenever the engine crankshaft has rotated through 120 degrees in the case of a six-cylinder engine (720°/6=120°) (180° in the case of a four-cylinder engine) and outputs a position signal $S_3$ whenever the crankshaft has rotated through two degrees, or alternatively one degree.

A cylinder pressure sensor 21 monitors the combustion chamber pressure as reflected in the vibrations of the engine block and outputs a cylinder pressure signal $S_{21}$ to an electric charge amplifier 31.

Figure 4A:
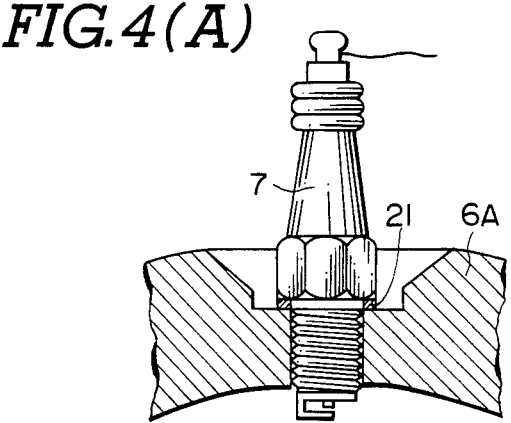
FIGS. 4(A) and 4(B) are respectively a cross-sectional view and a plan view of an example of a cylinder pressure sensor.
Figure 4B:
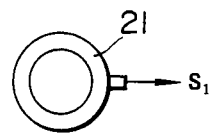

The cylinder pressure sensor 21 may comprise the piezoelectric element shown in FIGS. 4(A) and 4(B). The sensor 21 fits around the spark plug 7 shown in FIG. 1 as a washer and, the spark plug 7 is screwed tightly into the cylinder head 6A. The sensor 21 outputs an electrical charge signal $S_1$ according to pressure in the engine cylinder (cylinder pressure) which corresponds to the spark plug 7 to which the sensor element 21 is attached.

Figure 5:
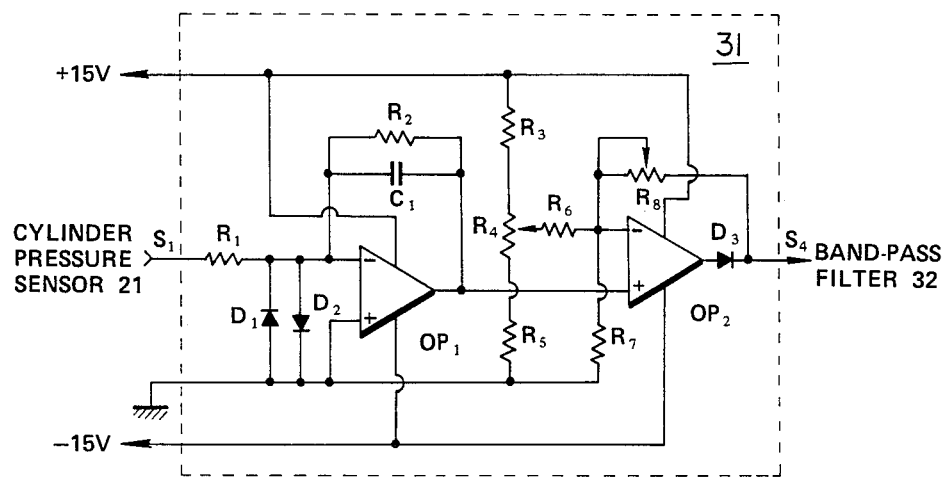
FIG. 5 shows the circuit configuration of an example of a charge amplifier.

The charge amplifier 31 in the control unit 11 is shown in detail in FIG. 5. As shown in FIG. 5, the charge signal $S_1$ from the cylinder pressure sensor 21 is sent to a charge-to-voltage conversion circuit comprising resistors $R_1$ and $R_2$, two anti-parallelly connected diodes $D_1$ and $D_2$, and a first operational amplifier $OP_1$. The resistor $R_1$ and two diodes $D_1$ and $D_2$ connected between two inverting and non-inverting input terminals of the first operational amplifier $OP_1$ serve as a protection circuit protecting the operational amplifier $OP_1$ from input levels exceeding the rating of the amplifier $OP_1$. The charge-to-voltage conversion circuit converts the charge signal $S_1$ into the corresponding voltage and is followed by an inverting amplifier comprising resistors $R_3$, $R_4$, $R_5$, $R_6$, $R_7$, and $R_8$, diode $D_3$, and a second operational amplifier $OP_2$. A nominal detection signal $S_4$ available at the output terminal of the second operational amplifier $OP_2$ is output to a band-pass filter 32 via the diode $D_3$.

The band-pass filter 32 transmits only those components of the signal $S_4$ having frequencies falling within a predetermined frequency band (about from 6 to 17 kilohertz) related to resonant frequencies of knocking. The extracted signal is then outputted by the band-pass filter to first and second vibration energy detection circuits 33 and 34 as a regular detection signal $S_5$.

The first vibration energy detection circuit 33 periodically produces a value $S_6$ related to the combustion pressure vibration energy over a period during which knocking cannot occur. The periodic timing may be determined by the reference signal $S_2$ and position signal $S_3$ received from the crank angle sensor 13. For example, the first vibration energy detection circuit 33 may integrate the detection signal $S_4$ to produce an integrated value indicative of vibration energy.

The second vibration energy detection circuit 34 is identical to the first 33, but produces a value $S_7$ to the combustion pressure vibration energy over a period during which knocking may occur.

Figure 6:
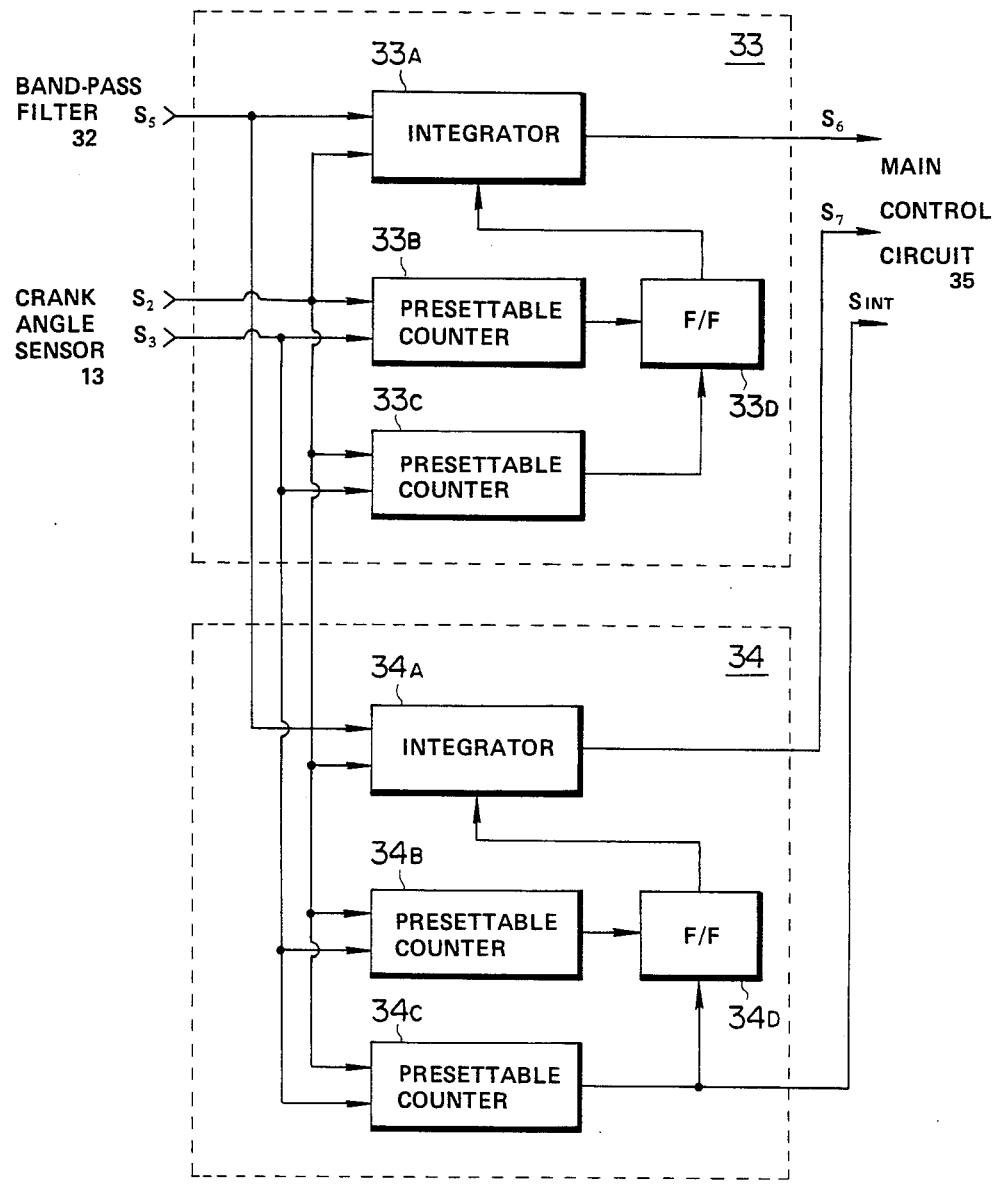
FIG. 6 is a circuit block diagram of vibration energy detection circuits.

The first vibration energy detection circuit 33, as shown in FIG. 6, comprises; (a) an absolute-value integration circuit 33A which full-wave rectifies and integrates the regular detection signal $S_5$ from the band-pass filter 32; (b) first and second presettable counters 33B and 33C which are preset to values corresponding to a predetermined crank angle and which start to count the position signal pulses $S_3$ from the crank angle sensor 13 in response to the reference signal $S_2$; and (c) a flip-flop circuit (F/F) 33D which controls operation of the absolute-value integration circuit 33A in response to output signals of the presettable counters 33B, 33C.

The second vibration energy detection circuit 34 comprises the same elements and configuration as the first vibration energy detection circuit 33; i.e., absolute-value integration circuit 34A, presettable counters 34B, 34C, and flip-flop circuit (F/F) 34D, all identical to their counterparts above.

Assuming that the present invention is applied to a six-cylinder internal combustion engine, that the reference signal $S_2$ is produced 70 degrees before the top dead center of each compression stroke of the cylinders, and that the vibration energy values are produced between when the piston reaches 40 degrees before the top dead center in the compression stroke until the piston falls 40 degrees after the top dead center (40° BTDC to 40° ATDC), then the respective presettable counters will be preset to the following preset values:

(1) Presettable counter 33B ←a crank angle of 30 degrees (the crank angle means an angle through which the engine crankshaft has rotated)
(2) Presettable counter 33C ←a crank angle of 70 degrees
(3) Presettable counter 34B ←a crank angle of 70 degrees
(4) Presettable counter 34C ←a crank angle of 110 degrees It should be noted that the output signal of the presettable counter 34C (the signal outputted when the crank angle of 110 degrees is reached) is sent to a main control unit 35, to be described later, as an external interrupt request signal $S_{INT}$.

Figure 7:
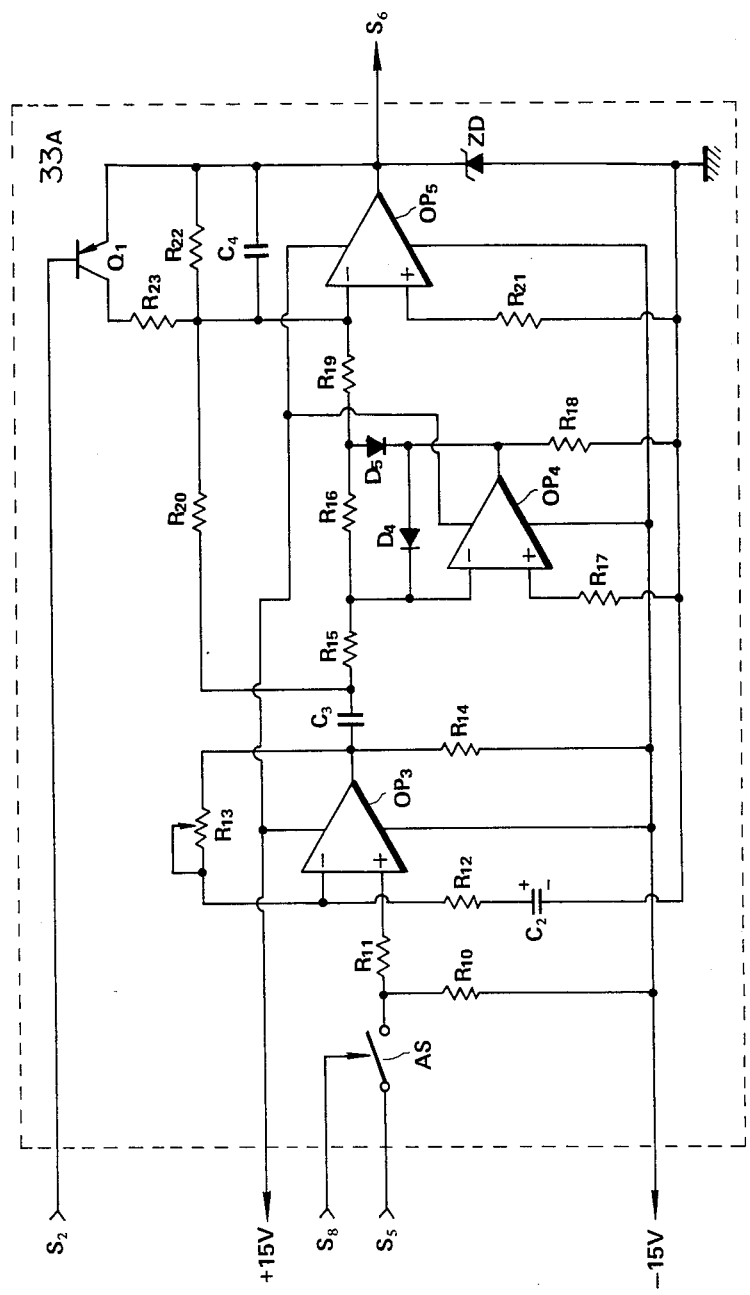
FIG. 7 shows the circuit configuration of an example of an integrator shown in FIG. 6.

FIG. 7 shows a specific example of the absolute-value integration circuit 33A of the first vibration energy detection circuit 33. The output signal $S_8$ from the flip-flop circuit (F/F) 33D shown in FIG. 6 is sent to an analog switch AS, the analog switch AS being closed when the ouput signal $S_8$ is at a low level "L". When the analog switch AS is closed, the detection signal $S_5$ from the band-pass filter 32 is sent to the non-inverting input terminal of an operational amplifier $OP_3$ by which the detection signal $S_5$ is amplified. The non-inverting amplifier comprises resistors $R_{10}$, $R_{11}$, $R_{12}$, $R_{13}$, and $R_{14}$, the operational amplifier $OP_3$, and a capacitor $C_2$.

Thereafter, the amplified detection signal is sent to a half-wave rectifier. The half-wave rectifier comprises: a capacitor, resistors $R_{15}$, $R_{16}$, $R_{17}$, and $R_{18}$, an operational amplifier $OP_4$, and diodes $D_4$ and $D_5$. The half-wave rectified output signal and the amplified detection signal are thereafter synthesized (i.e., consequently full-wave rectified) and integrated by means of an integrator which comprises an operational amplifier $OP_5$, resistors $R_{19}$, $R_{20}$, $R_{21}$, and $R_{22}$, a capacitor $C_4$, and a zener diode ZD.

The integrated value is, thus, outputted as an integration signal $S_6$ from the output terminal of the operational amplifier $OP_5$. In addition, at the instant the analog switch AS opens, the integration value is latched. It should be noted that a reset circuit comprising a resistor $R_{23}$ and transistor $Q_1$ is operated, i.e., the transistor $Q_1$ is rendered conductive to short the terminals of the capacitor $C_4$ so that the electric charge on the capacitor $C_4$ is discharged, i.e., the integrator is reset, when the reference signal $S_2$ is inputted to the base of the transistor $Q_1$. It should also be noted that since the absolute value integration circuit 34A of the second vibration energy detection circuit 34 has the same structure and operation, the description of the circuit 34A will be omitted here.

The main control circuit 35 comprises a microcomputer having, as shown in FIG. 2(B), an I/O port 39 including analog-to-digital and digital-to-analog converters, Read-Only Memory (ROM) 37, Random-Access Memory (RAM) 38, and a Central Processing Unit (CPU) 36.

The main control unit 35 receives various detection signals; the reference and position signals $S_2$ and $S_3$ from the crank angle sensor 13, the integration signals $S_6$ and $S_7$ from the first and second vibration energy detection circuits 33 and 34, the external interrupt request signal $S_{INT}$ from the second vibration energy detection circuit 34, and various other detection signals described with reference to FIG. 1.

In this embodiment, the main control circuit 35 detects occurrences of knocking, derives its intensity if knocking occurs, records the number of occurrences of knocking, derives a correction value for ignition timing, executes ignition by controlling the final stage of a power transistor 41 connected to an ignition coil 22 of an ignition circuit 40.

The ignition timing control (on-and-off control of the power transistor 41) is carried out by setting angular position values corresponding to the determined ignition timing (advance angle value, dwell angle) in an advance angle register (ADV) in the I/O Port 39 (not shown) and dwell angle register (DWELL) respectively (not shown), comparing the values of these registers to the value of a counter (not shown) which counts the pulses of the position signal $S_3$, and issuing a command signal to turn the transistor 41 on and off as the two values come into coincidence with the counter value. The ignition circuit 40 energizes the current spark plug 7 by applying a high voltage surge across the spark gap of the spark plug 7 when the high voltage surge is generated at the secondary winding of the ignition coil 22 as the power transistor 41 is turned on and off.

FIG. 3 is a functional block diagram of the main control unit 35 shown in FIG. 2(B), particularly pertinent to ignition timing control.

A ratio calculating block 35A calculates a ratio (or difference) between the integration signal $S_6$ from the first vibration energy detection circuit 33 and the integration signal $S_7$ from the second vibration energy detection circuit 34 and outputs the calculated ratio as a detected combustion pressure vibration energy value.

A knock-detection block 35B compares the detected vibration value from the ratio calculating block 35A to a reference value from a reference value generating block 35C in order to determine whether knocking has occurred. The reference value generating block 35C comprises a table stored in the ROM 37 of the main control circuit 35.

A correction-derivation block 35D derives a correction value for the ignition timing in accordance with the output of the ratio calculating block 35A when knocking is detected.

An ignition timing control block 35E corrects the basic ignition timing determined on the basis of the intake air quantity and engine revolution speed by the correction value produced by the correction derivation block 35D and controls the ignition circuit 40 according to the results of this correction.

It should be noted that although the main control circuit 35 controls engine operations other than ignition, the other engine operations will not be discussed. It should also be noted that although the above-described cylinder pressure sensor 21 and charge amplifier 31 are shown and described for only one cylinder, sensors and amplifiers are installed for the other cylinders as well so that the output of each charge amplifier is sent via a multiplexer to the band-pass filter 32. Similarly, this can apply equally well to the ignition circuit 40, i.e., an ignition circuit 40 may be provided for each cylinder or a conventional distributor or equivalent may be installed to connect all of the spark plugs 7 in common to the power transistor 41 and ignition coil 22.

The theory of knock detection used in this embodiment will be explained below with reference to FIG. 8 and subsequent drawings.

FIG. 8 shows exemplary power spectra of cylinder pressure vibrations during knocking and during normal operation. The cylinder pressure vibration in the absence of knocking is represented by the curve I whereas that during knocking, as thus of relatively greater intensity (level) is represented by the curve II. FIG. 8 shows the results of experiments carried out by the Applicants in the case of a four-cylinder engine with a displacement of 1800 cc operating at full load and an engine speed of 4800 rpm. In addition, the Applicants have confirmed that similar power spectra will be observed for other types of engine.

As appreciated from FIG. 8, there is a large difference in the power level in units of decibel (dB) between the lines I and II in a frequency band from about 6 to about 17 kilohertz.

The electric charge signal from each cylinder pressure sensor is converted into the corresponding voltage signal and signal components having the frequency falling within the above-described frequency band are extracted from the charge-converted voltage signal to produce the signal waveforms shown in FIGS. 9(A) and 9(B) (hereinafter referred to as extraction signals) during normal operation and knocking, respectively.

The power $\Phi$ of a signal $x(t)$ at a particular frequency band can generally be expressed by the equation:

$$\Phi = (\tfrac{1}{2}T) \int_{-T}^{T} x^2(t)dt \qquad (1)$$

In other words, the power $\Phi$ is the mean value over time of the square of the signal amplitude.

Integrating the absolute value of the extraction signal shown in FIGS. 9(A) and 9(B) yields the following expression:

$$\frac{1}{2T} \int_{-T}^{T} |x(t)|dt = \frac{1}{2T} \int_{-T}^{T} \sqrt{x^2(t)}\, dt \qquad (2)$$

Since the right side of the above equation (2) represents the root-mean-square (RMS) of the signal $x(t)$, the left side of the above equation (2) can be recognized to represent the power of signal $x(t)$ or at least a first-order function of the power.

It should be noted that it is practically of no significance that the signal $x(t)$ may include a plurality of frequency components even though the signal $x(t)$ in both equations (1) and (2) was assumed to have a single frequency component.

The integration signal is exemplified by FIG. 10(A) wherein the absolute extraction signal value (shown in FIG. 9(A) is integrated while knocking cannot occur, specifically over the crank angle range from 40 degrees before top dead center (40° BTDC) to top dead center. Similarly, the other integration signal is exemplified by FIG. 10(B) wherein the absolute extraction signal value is integrated over a period during which knocking may occur, specifically over the crank angle range from the top dead center (TDC) to 40 degrees after the top dead center (40° ATDC) and, in the example of FIG. 10(B), knocking has in fact occurred. As knocking will occur only following fuel mixture ignition, the former integration period will be referred to hereafter as "pre-ignition" and the latter as "post-ignition". The pre-ignition period in this system should not be confused with the so-called pilot ignition employed in some interval combustion engines.

The integration signals exemplified by FIGS. 10(A) and 10(B) correspond to the cylinder pressure vibration energy. In order words, the integration signals represents the above equation (2) but from which the term $(\tfrac{1}{2}T)$ is omitted.

In the case of FIG. 10(A), which holds for both pre-ignition and knock-free post-ignition, the integration signal value increases linearly as long as no knocking occurs. This reflects the generation of a constant level of energy independent of the crank angle.

The following relationship is satisfied in the absence of knocking:

$$\int_{T=-40°}^{0°} x(t)dt = \int_{0°}^{T=+40°} x(t)dt \qquad (3)$$

where the top dead center (TDC) is at T=0°.

On the other hand, as appreciated from FIG. 10(B), an increment to the energy appears due to knocking in the expansion stroke after the top dead center (TDC).

In general, the human ear detects knocking by the difference in relative intensity between sound pressure levels due to background noises generated normally and those due to the knocking vibrations.

If, therefore, the vibration energies due to the cylinder pressure in cases of non-knocking and of knocking are compared directly, the knocking intensity can be sensed in close correspondence to human sensitivity.

Empirically, knocking does not occur before the piston reaches top dead center (TDC). Thus, the integration signal value produced before top dead center (TDC) can be used as the expected value of cylinder pressure vibration energy during the expansion stroke after the top dead center (ATDC) in the absence of knocking, as is the case in equation (3).

The comparison between the integration values of the cylinder pressure vibrations within a predetermined crank angle range before and after top dead center has the same effect as comparing cylinder pressure vibration energies during normal operation and during the current combustion stroke. Thus, this comparison will yield knocking detection results which closely correspond to human hearing.

Numerous experiments by the Applicants reveal that the relationship reflected in equation (3) holds under almost all engine operating conditions for all common models of engines.

It should be noted that an interval of integration must be so selected that the relationship reflected in equation (3) is always accurate. Specifically, the spark plug 7 vibrates so as to upset the above relationship due to vibrations generated as corresponding intake and exhaust valves close and open corresponding intake and exhaust ports. Accordingly, in the first preferred embodiment, the interval between 40 degrees before and after the top dead center is used to avoid extraneous vibrations.

The operation of the first and second vibration energy detection circuits 33, 34, will be described below with reference to FIG. 11.

Figure 11:
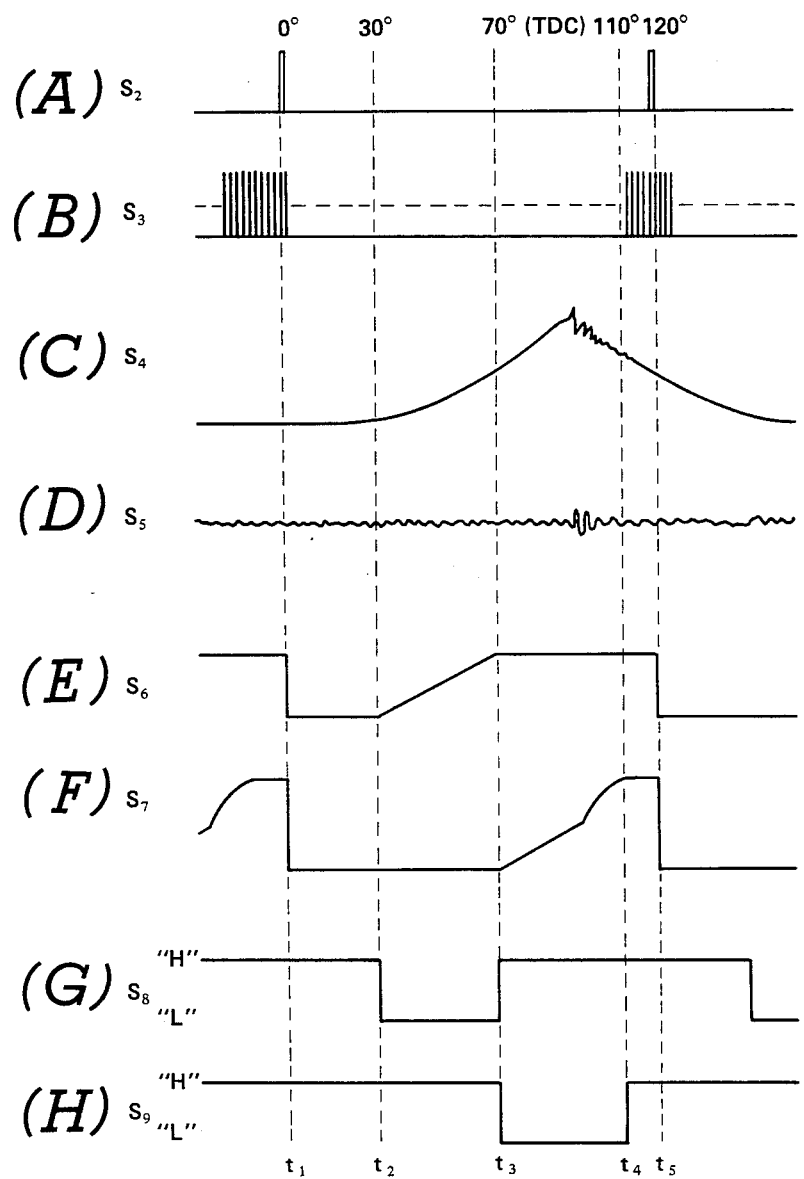
FIG. 11 is a timing chart for the vibration energy detection circuits shown in FIG. 6.

First, in the crank angle range from 0° to 120°, the charge amplifier 31 outputs the detection signal $S_4$ as shown in (C) of FIG. 11. After the detection signal $S_4$ passes through the band-pass filter 32, the detection signal $S_5$ (extraction signal described above) shown in (D) of FIG. 11 is sent to the first and second vibration energy detection circuits 33, 34. It should be noted that the detection signal $S_5$ is dominated by the resonant frequency components of knocking.

The integration circuits 33A, 34A shown in FIGS. 6 and 7 are reset at time $t_1$ in response to the reference signal $S_2$ ((A) of FIG. 11) from the crank angle sensor 13, which is defined as the zero-degree, position (0°) of the crank angle (70° BTDC). At the same time the above-described preset values are loaded into the presettable counters 33B, 33C, 34B, 34C, which then start counting the position signal pulses $S_2$ shown in (B) of FIG. 11.

Thereafter, the output level of the presettable counter 33B of the first vibration energy detection circuit 33 inverts at a time $t_2$ 30 degrees of crank rotation after time $t_1$ so that the output level $S_8$ of the flip-flop circuit (F/F) 33D inverts to the lower "L" level. Thus, the integration circuit 33A is enabled to start integrating the absolute value of the detection signal $S_5$ from the band-pass filter 32 over the pre-ignition period.

Thereafter, the output level of the presettable counter 33C inverts again at time $t_3 = 70° = $ TDC so that the output level $S_8$ of the flip-flop circuit 33D again inverts to the higher "H" level. Consequently, the integration circuit 33A holds the final integration value from time $t_3$ until next reference signal $S_2$ is received at time $t_5$. Thus, the integration circuit 33A outputs the pre-ignition integration signal $S_6$ corresponding to the vibration energy during the pre-ignition period as shown in (E) of FIG. 11.

Similarly, the output level of the presettable counter 34B inverts at time $t_3 = 70°$ so that the output level $S_9$ of the flip-flop circuit 34D inverts to the "L" level as shown in (H) of FIG. 11. Therefore, the absolute-value integration circuit 34A is enabled to start integrating the absolute value of the detection signal $S_5$ from the band-pass filter 32 over the post-ignition period.

Thereafter, the output level of the presettable counter 34C again inverts at time $t_4 = 110°$ so that the output level $S_9$ of the flip-flop circuit 34D inverts back to the higher "H" level. Consequently, the integration circuit 34A holds the final post-ignition integration value from time $t_4$ until the next reference signal $S_2$ is received at time $t_5$.

The absolute-value integration circuit 34A outputs the post-ignition integration signal $S_7$ corresponding to the vibration energy over the period during which knocking may occur as shown in (F) of FIG. 11.

The procedure for detecting occurence of knocking and deriving the correction value for ignition timing will be described below with reference to FIGS. 12(A), 12(B), and 12(C).

The CPU 36 of the main control circuit 35 shown in FIG. 3 starts executing the program of FIG. 12 when the second vibration energy detection circuit 34 issues an external interrupt request signal $S_{INT}$ at time $t_4$ (40° ATDC).

As shown in FIG. 12(A), the CPU 36 issues a command to the analog-to-digital converter (A/D converter) incorporated in the I/O Port 39 to start digital conversion of the integration signal $S_6$ derived by the first vibration energy detection circuit 33 in the initial STEP 1.

In the next STEP 2, the CPU 36 issues a command to store the digitalized integration signal $S_6$ in a predetermined address of the RAm 38 as a quantity B associated with the vibration energy during the pre-ignition period.

In the next STEPs 3 and 4, the CPU 36 issues consecutive commands to the A/D converter to store the digitalized integration signal value $S_7$ from the second vibration energy detection circuit 34 in another predetermined address of the RAM 38 as a quantity K associated with the vibration energy during the post-ignition period.

In the next STEP 5, the CPU 36 selects and reads a reference value SL specified by the current engine speed from a reference table stored in the ROM 37.

It should be noted that the engine revolution speed can be measured by counting the number of position signal pulses $S_3$ from the crank angle sensor 13 received per unit of time in a separate processing routine (not shown) and storing the counted value temporarily in a predetermined address of the RAM 38.

In the next STEP 6, the CPU 36 reads the two quantities B and K obtained in the previous steps and calculates the ratio K/B (or difference K−B) in order to normalize the quantity K. This ratio value will be simply referred to as the K/B value.

The above-mentioned reference value SL will briefly be described below.

Figure 13:
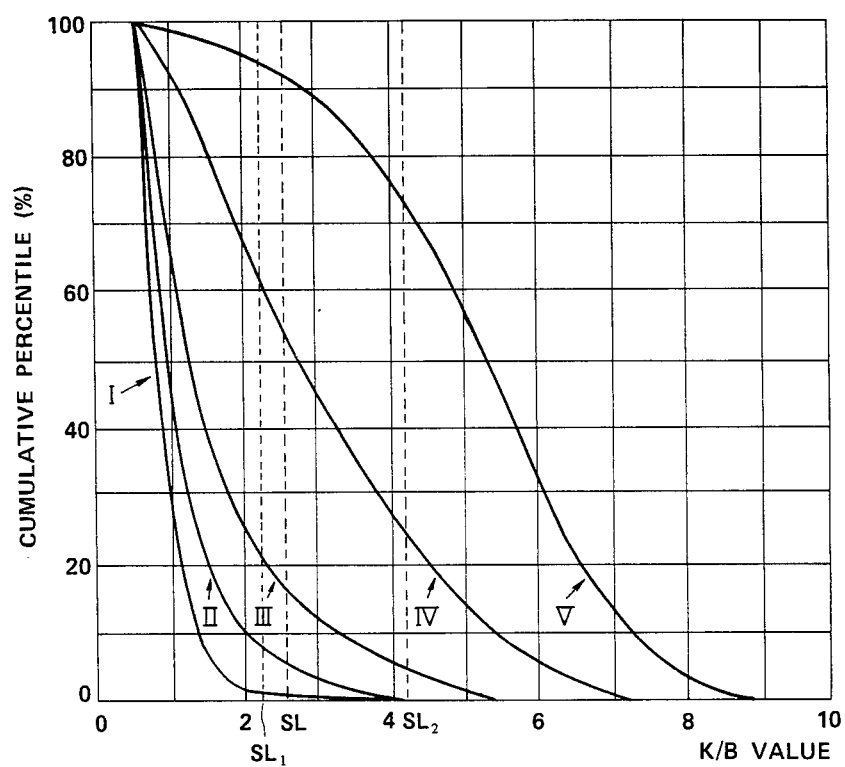
FIG. 13 shows typical accumulated percentile distribution of the K/B value shown in FIG. 12(A) for various degrees of knocking.

The cumulative percentile distribution of the K/B value for various types of knocking phenomena in the six-cylinder engine is shown in FIG. 13.

In FIG. 13, the cumulative percentile distribution of the K/B value in the total absence of knocking is denoted by line I, that for trace knocking is denoted by line II, that for light knocking is denoted by line III, that for moderate knocking is denoted by line IV, and that for severe knocking is denoted by line V. Although the cumulative percentile distributions shown in FIG. 13 are experimental results obtained under controlled conditions, similar results will be obtained for almost all engines and most conditions.

The reference value SL for the experimental conditions is set to the value (SL=2.6) shown in FIG. 13. As explained later, this allows about 50% detection of moderate knocking and >90% detection of severe knocking.

Figure 14:
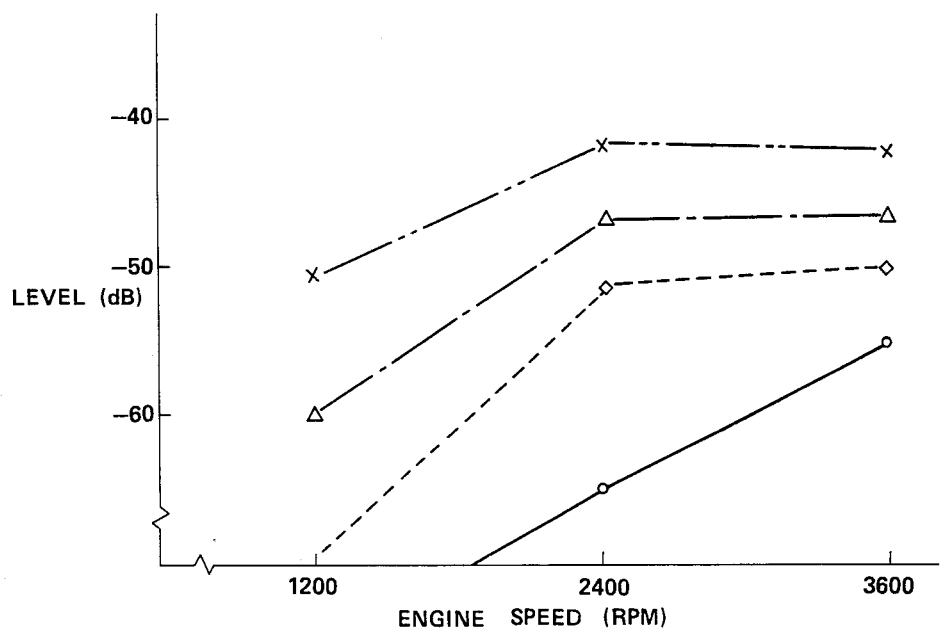
FIG. 14 is a graph of an example of the relationship between power level and engine revolution speed for each knocking pattern.

Exemplary relationships between the power levels of the various degrees of knocking described above and the engine revolution speed are plotted in FIG. 14, in which the solid line denotes the power level variation when no knocking occurs, the broken line denotes trace knocking, the dot-dashed line denotes light knocking, and the dot-dot-dashed line (phantom line) denotes medium knocking.

As can be appreciated from FIG. 14, since the functional sensitivity of the human ear is lowered by the influence of the mechanical vibrations of the engine itself at high engine speeds, human control wound result in a relatively broad range of allowed knocking intensity.

Engine performance can be noticeably enhanced by varying reference value SL according to the engine speed. However, the reference value SL may also be fixed at 2.6 or some other value.

Figure 12B:
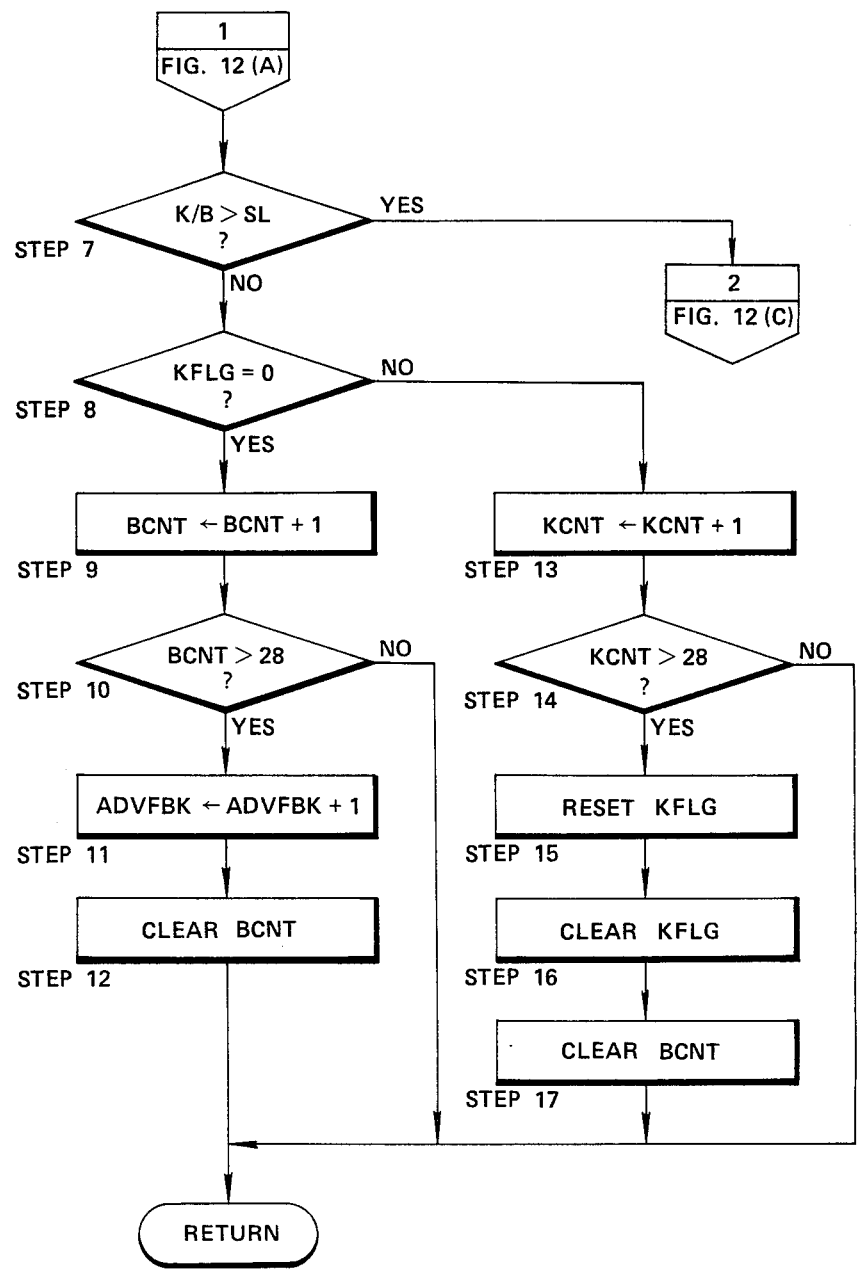
Figure 12C:
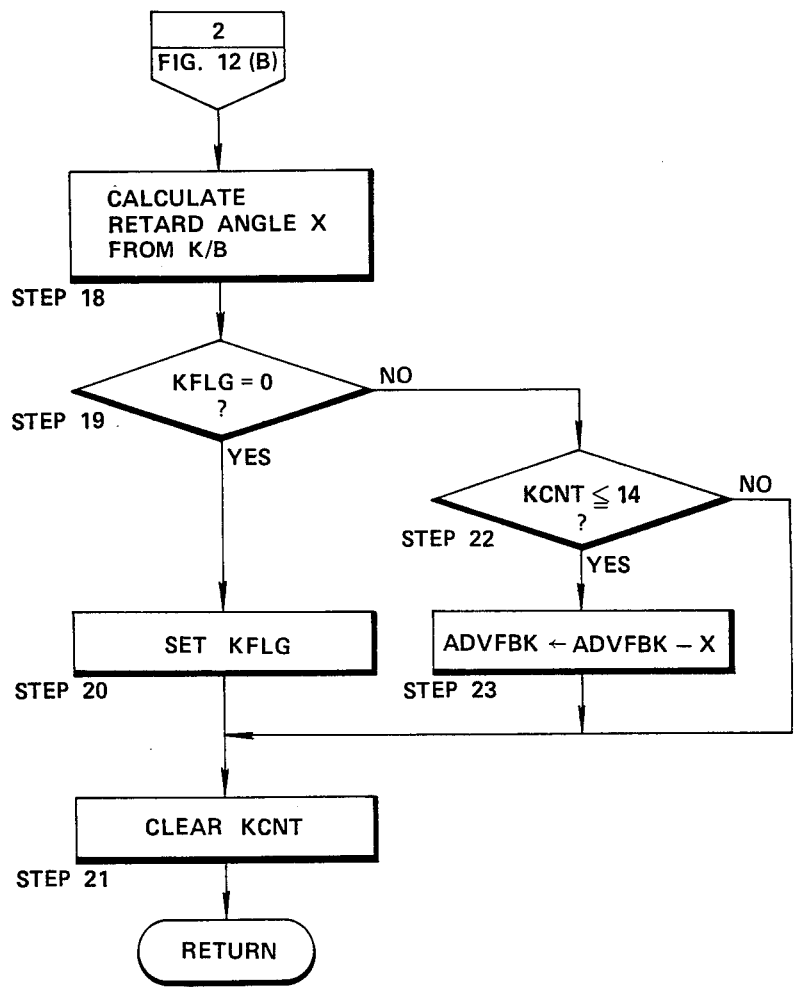

Returning to FIG. 12, the following abbreviations will be used in FIGS. 12(B) and 12(C):

KFLG: a flag representing the presence or absence of knocking.

BCNT: a value representing the number of times ignition has been carried out since the flag KFLG was last set, hereinafter referred to as count value BCNT.

ADVFBK: the correction value added to the reference value of the ignition angle, hereinafter, referred to as a correction ADVFBK. The ignition timing is advanced when the correction ADVFBK is positive and is retarded when it is negative.

The flag KFLG, the count values KCNT, BCNT and correction ADVFBK are stored in predetermined addresses in the RAM 38 allocated to these values.

As shown in FIG. 12(B), the CPU 36 compares the K/B value calculated in the previous STEP 6 to the reference value SL to determine whether K/B value >SL in a STEP 7. If K/B>SL (Yes) in the STEP 7, knocking is detected and the routine goes to STEP 18 to be described later. If K/B≦SL (No) in STEP 7, knocking is not detected and the routine goes to a STEP 8, wherein the CPU 36 determines whether the flag KFLG is set to "0" (when knocking has occurred, the flag KFLG is set "1" in STEP 20 to be described later).

If the flag KFLG has the value "0" at STEP 8, i.e., if knocking has not previously occurred, the routine goes to a STEP 9, wherein the value of the count BCNT is incremented by one (+1). Whenever the flag KFLG is found to be set to "0" in STEP 8, the contents of the counter BCNT are incremented in STEP 9. In the next STEP 10, the CPU 36 determines whether the value of the count BCNT exceeds 28 (BCNT>28). If BCNT≦28 in STEP 10, the routine ends. If BCNT>28, the routine goes to a STEP 11, wherein the correction to the ignition timing ADVFBK is incremented by one (+1), whereby the ignition timing is advanced by one degree. In the next STEP 12, the count value BCNT is cleared. The processing routine then ends.

On the other hand, if the flag KFLG has the value "1" at STEP 8, i.e., if knocking has previously occurred, the routine goes to a STEP 13. At STEP 13, the CPU 36 increments the count value KCNT by one (+1) and thereafter determines whether the count value KCNT exceeds 28 (KCNT>28) in a STEP 14. If KCNT≦28 at STEP 14, the processing routine ends. If KCNT>28, the flag KFLG is reset in a STEP 15, the count value KCNT is cleared in a STEP 16, and the count value BCNT is cleared in a STEP 17.

If the K/B value > the value SL at STEP 7, i.e., if knocking is recognized, the routine goes to a STEP 18, wherein a retardation angle X corresponding to the current K/B value is calculated. The retardation angle X is previously stored in the ROM 37 in the form of a table in which each retardation value X corresponds to a calculated K/B value. Therefore, the CPU 37 finds the retardation value X by the well-known table lookup technique. In practice, as the K/B value increases, the retardation amount X also increases.

In the next STEP 19, the CPU 36 determines whether the flag KFLG is equal to "0" in order to confirm the initial occurrence of knocking. At this time, if the flag KFLG is currently at "0", i.e., if this is the first occurrence of knocking, the routine goes to a STEP 20, wherein the flag KFLG is set to "1" (KFLG=1. In the next STEP 21, the count value KCNT is cleared and then the processing routine ends.

If, on the other hand, the flag KFLG is not equal to "0", i.e., if this is the second or later cycle in which knocking has occurred, the routine goes to a STEP 22, wherein the CPU 36 determines whether the ignition has previously been carried out at least 14 times (KCNT≦14), i.e., whether the inequality K/B>SL has been satisfied for at least 14 cycles. If so, the routine goes to the STEP 21 described above to clear the count value KCNT. If KCNT≦14, the routine goes to a STEP 23, wherein the correction ADVFBK is decremented by the retardation angle X (−X) to retard the ignition timing by the retardation angle value X. Thereafter, the routine goes to the above-described STEP 21 and then ends. The value 28 used in STEPs 10 and 14 and the value 14 used in STEP 22 are derived from the distribution II of FIG. 13. In STEPs 10 and 14 et seq., 28 consecutive ignition cycles in which K/B≦SL falls well within the expectable rate of occurrence of high K/B values during trace knocking (since K/B>SL 7% of the time, or 1 time in 14). Similarly, in STEPs 22 et seq., in each string of 14 consecutive cycles in which K/B≦SL, one occurrence of a relatively high K/B can be expected, but a second implies knocking, and so the advance angle is decremented to suppress knocking. Thus, the engine ignition timing can be controlled so as to achieve the desired level of knocking.

For example, the numbers used in STEPs 14 and 22 may be set to 12 and 6 (100/16÷6) respectively in order to detect light knocking, and if the above numbers are set to 8 and 4 (100/25=4) medium knocking can be detected. This fact has been confirmed by experiments performed by the Applicants.

In this way, knocking intensity is recognized from the frequency of the occurrence of knocking and the correction to the ignition timing is determined on the basis of the recognized knocking intensity.

Following STEPs 11 and 23, the CPU 36 may be instructed to ensure that the correction ADVFBK falls within a predetermined range in order to place a limitation on the value of the correction ADVFBK so that the ignition timing will not be excessively advanced or retarded.

Figure 15:
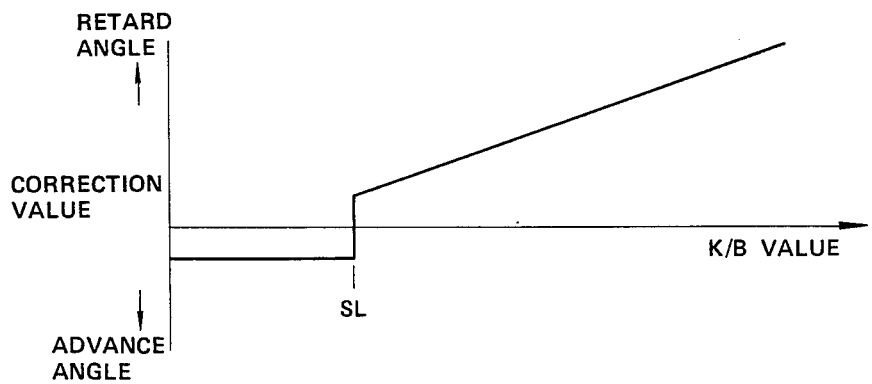
FIG. 15 is a graph of the relationship between the K/B value shown in FIG. 12(A) and the correction to ignition timing.

The system for controlling the ignition timing of the internal combustion engine according to the present invention advances the ignition timing by a predetermined angular increment when K/B≦SL (non-knocking) continuously for a predetermined number of ignition cycles and retards the ignition timing in accordance with the magnitude of the K/B value, as shown in FIG. 15 i.e., with the intensity of knocking when K/B>SL (knocking) continuously for a predetermined number of cycles.

Although in the processing routine shown in FIGS. 12(A) through 12(C), the retardation angle X increases linearly with the value of K/B, the retardation angle X may alternatively increase stepwise or as some other incremental function. Thus, the retardation angle X can be set to a value ensuring quick suppression of knocking without adversely affecting engine performance.

Figure 16:
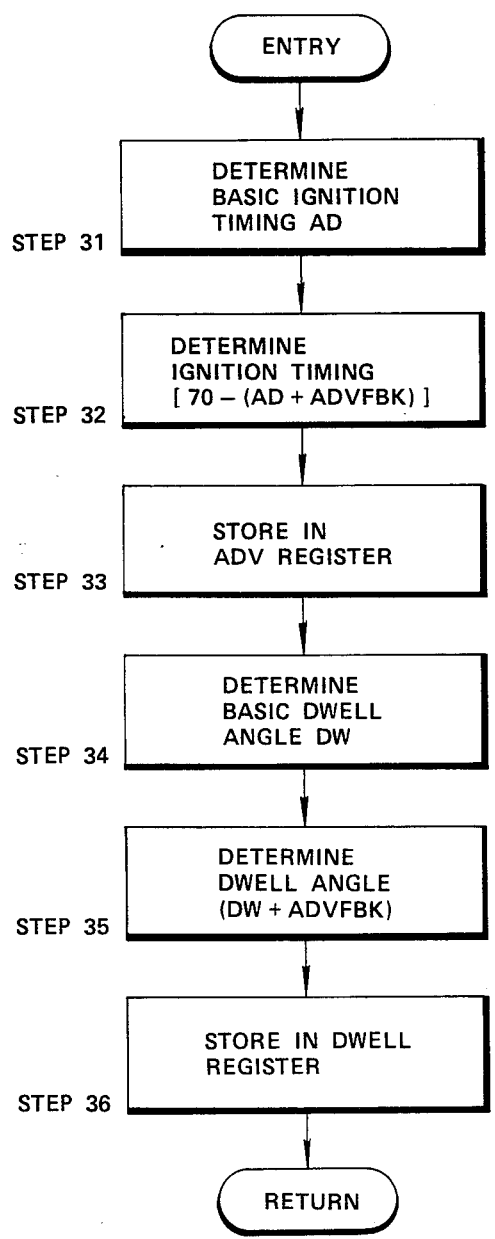
FIG. 16 is a flowchart of an example of an ignition timing control process executed by a main control circuit.

Ignition timing control is performed in accordance with a program shown in FIG. 16.

Figure 17:
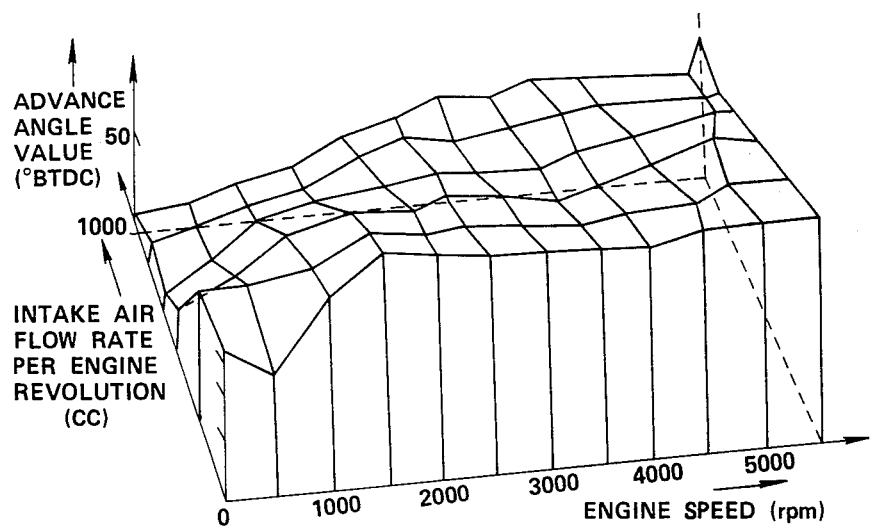
FIG. 17 is a three-dimensional contour graph of the relationships among engine revolution speed, intake air quantity per revolution, and advance angle for use in calculating a basic ignition timing shown in FIG. 16.

As shown in FIG. 16, in three consecutive STEPs 31, 32, and 33, the basic ignition timing value AD is determined according to the measured intake air quantity and engine revolution speed. The CPU finds the basic ignition timing AD in units of degrees before top dead center (BTDC) by means of the table look-up technique from a characteristic table shown in FIG. 17.

In the STEP 32, on the basis of the basic ignition timing AD and correction ADVFBK derived previously as shown in FIGS. 12(A) through 12(C), the CPU 36 evaluates the expression {70−(AD+ADVFBK)}, which represents the angular delay between the input timing of the reference signal S₂ and ignition, and the result is stored in an advance angle (ADV) register (not shown) in the I/O Port 39 in the STEP 33.

In the subsequent STEPs 34 through 36, the CPU 36 derives a basic dwell angle DW on the basis of the derived ignition timing, calculates the sum (DW+ADVFBK), and stores the result (DW+ADVFBK) in a dwell angle (DWELL) register in the I/O Port 39. In this way, the correction to the ignition timing does not affect the dwell angle.

In this embodiment, the correction (retardation) of the ignition timing is varied according to the intensity of knocking, thus suppressing knocking without adversely affecting engine performance.

Figure 18:
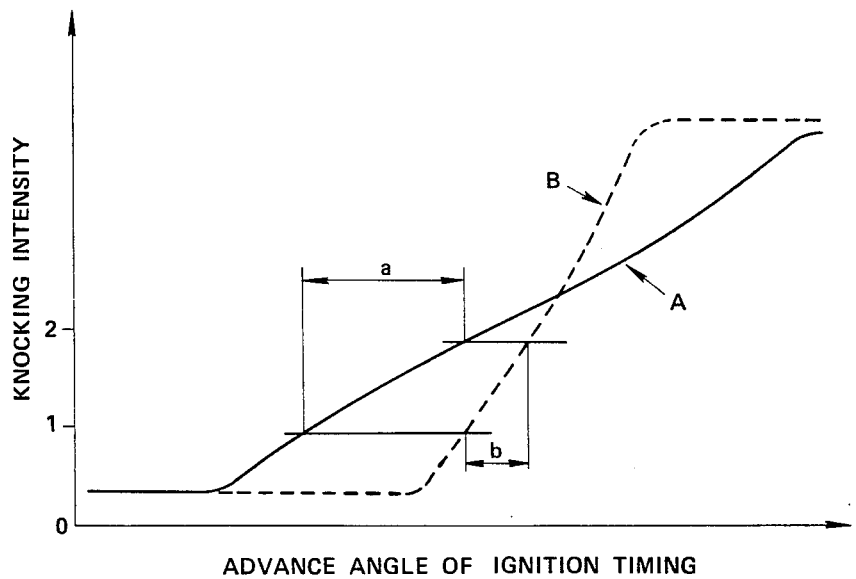
FIG. 18 shows a graph for use in a second preferred embodiment in determining the correction to the ignition timing.

FIG. 18 illustrates the concept of a second preferred embodiment.

The correction may be determined not only according to the intensity of knocking but also according to the cooling water temperature, engine speed, air-fuel mixture ratio, etc. As shown in FIG. 18, engine operating conditions can significantly affect the relationship between the ignition advance angle and knocking intensity. For example, the retardation a would be appropriate under operating conditions A in FIG. 18 in order to drop from knocking intensity 2 to knocking intensity 1 whereas the retardation b would be appropriate under operating conditions B.

Hence, optimum ignition timing control allowing quick response without reduction of output engine torque can be achieved by deriving the retardation (correction to ignition timing) according to knocking intensity and other engine operating conditions.

Furthermore, although the cylinder pressure sensor installed on the spark plug 7 is shown in FIGS. 4(A) and 4(B), other types of vibration sensor may be installed on a cylinder block of the engine or engine body. U.S. Pat. No. 4,106,447 to West discloses an engine knock sensor mounted on an intake manifold. The contents of this document are hereby incorporated by reference.

In addition, although the shown crank angle sensor produces the position signal S₃ whenever the crankshaft rotates through one or two degrees, the position signal S₃ may have a shorter period in order to allow more precise control of the ignition timing.

Figure 19A:
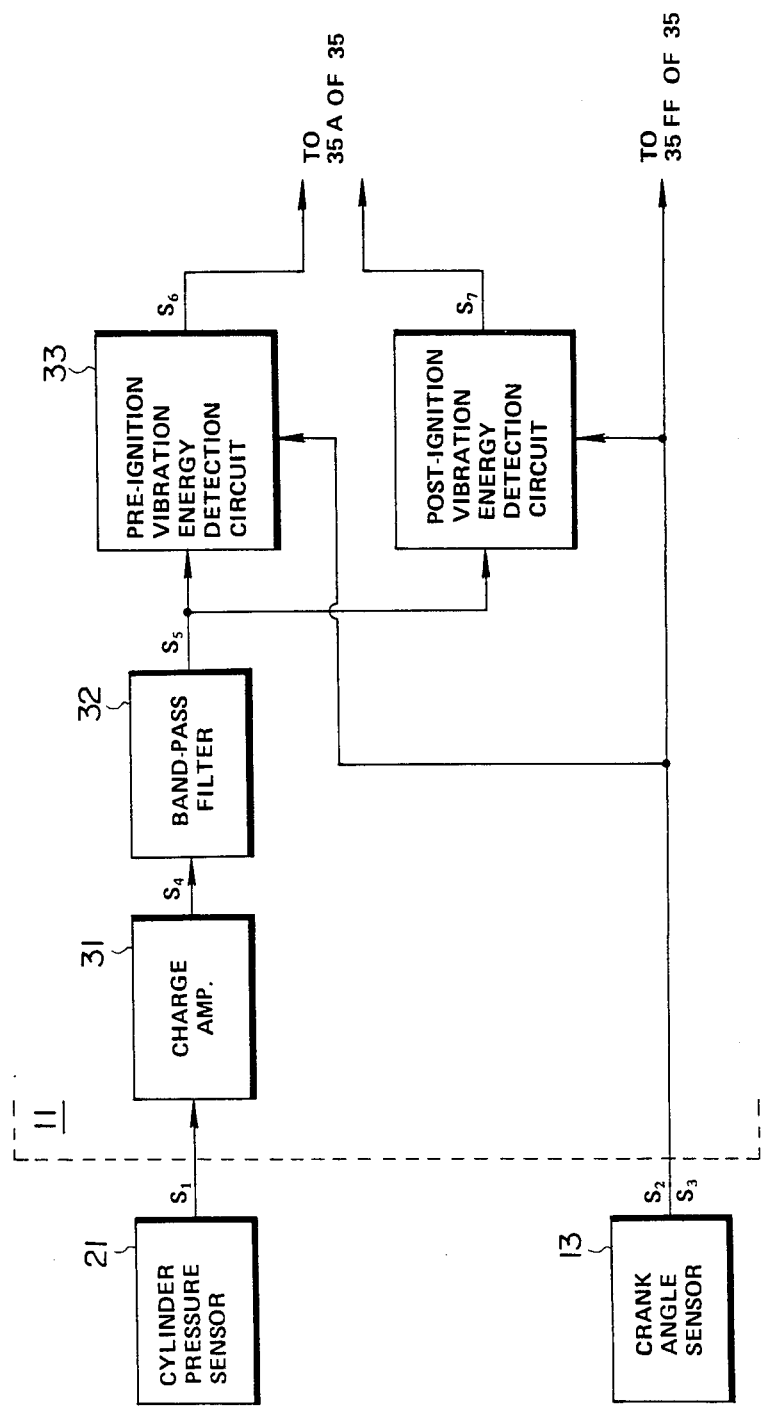

FIGS. 19(A) and 19(B) are a functional block diagram of a third embodiment of the present invention.

Figure 3A:
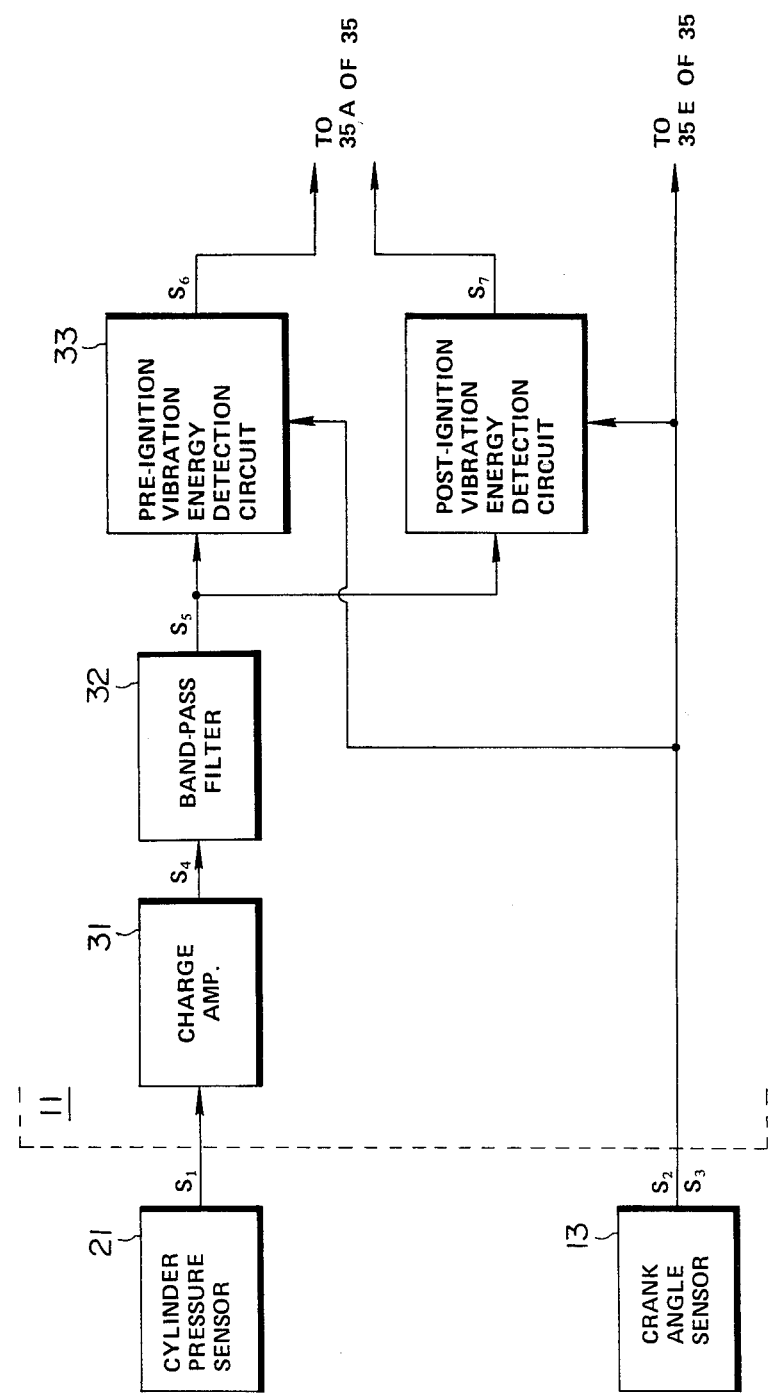
FIGS. 3A and 3B are a simplified functional block diagram of the control unit shown in FIG. 1.
Figure 3B:
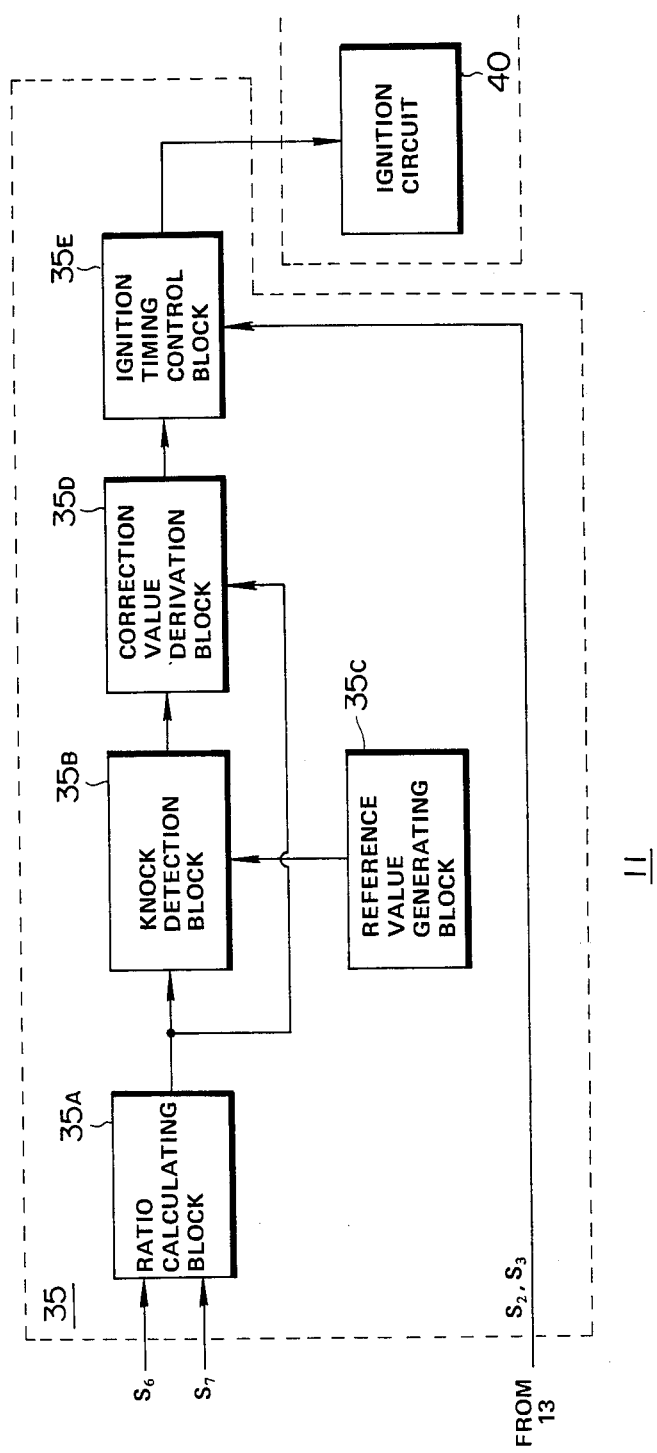

As shown in FIGS. 19(A) and 19(B), the function of the main control circuit 35 differs from the first preferred embodiment shown in FIGS. 3(A) and 3(B), although the connections among the other circuits external to the main control circuit 35 remain the same.

In the main control circuit 35, the ratio calculating block 35A calculates the ratio (or difference) between the integration signals $S_6$ and $S_7$ from the first and second vibration energy detection circuits 33, 34 and outputs the calculated ratio (or difference) as the detected value of the combustion pressure vibration energy, as in the first embodiment.

The knock-detection block 35B compares the detected value of the combustion pressure vibration energy with each of first and second reference values derived from first and second reference value generating blocks 35CC, 35DD, checks for severe and trace levels of knocking as reflected in the calculated ratio.

The first and second reference value generating blocks 35CC, 35DD comprises tables stored in the ROM 37 of the main control circuit 35 shown in FIG. 2(B).

The correction determining block 35EE confirms the occurrence of trace knocking tentatively detected by the knock-detection block and then derives the correction to the ignition timing in accordance with the detected level of knocking, if any.

The ignition timing control block 35FF corrects the basic ignition timing derived from the intake air quantity and engine speed by adding in the correction derived by the correction determining block 35EE and controls the ignition circuit 40 in accordance with the results of this adjustment to the ignition timing.

The operation of the second preferred embodiment will be described below. The theory of detecting knocking has already been described above with reference to FIGS, 8, 9 and 10.

In addition, the operation of the first and second vibration energy detection circuits 33, 34 have previously been described with reference to FIGS. 6, 7 and 11, and that description will not be repeated here.

The processing routine for detecting the knocking and deriving the correction executed by the CPU 36 of the main control circuit will be described below with reference to FIGS. 20(A), 20(B), and 20(C).

Figure 20A:
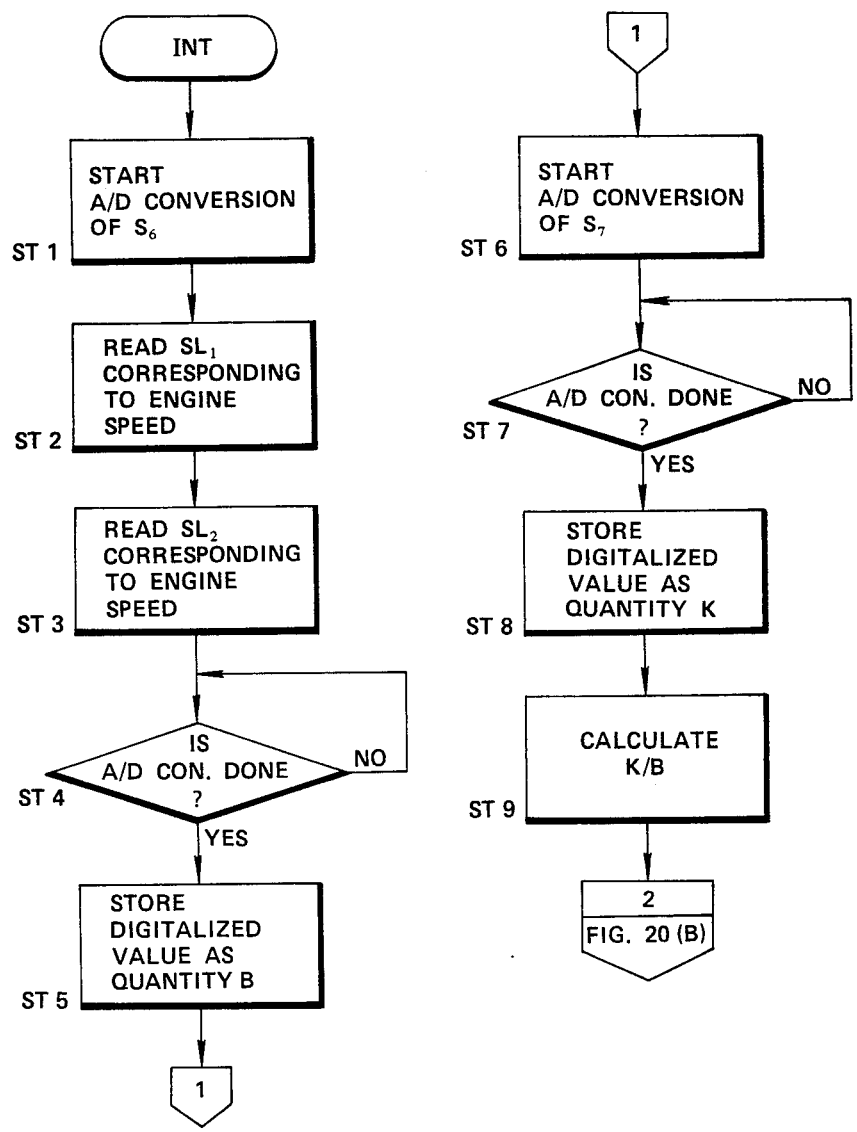
FIGS. 20(A), 20(B), and 20(C) are processing flowcharts for detecting of knocking and deriving a correction to ignition timing.
Figure 20B:
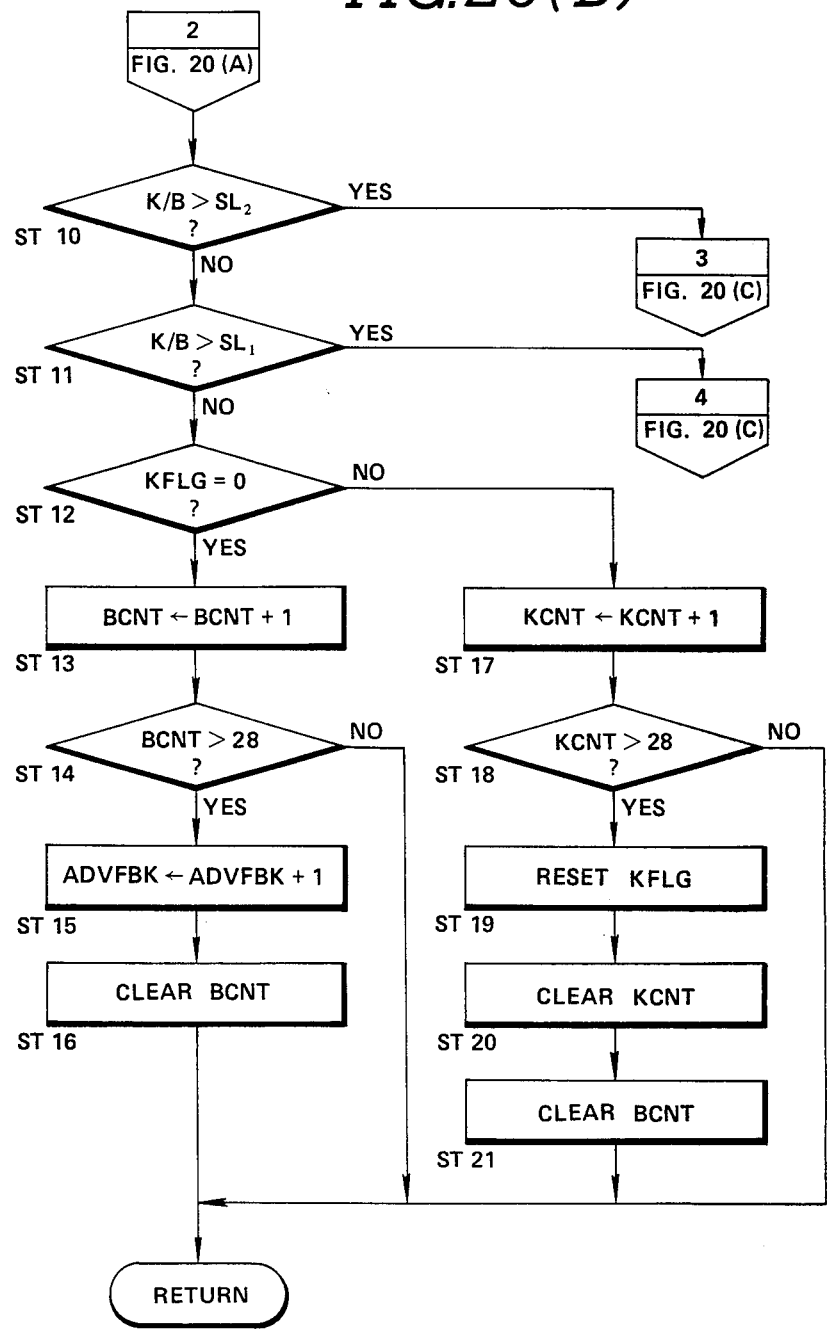
Figure 20C:
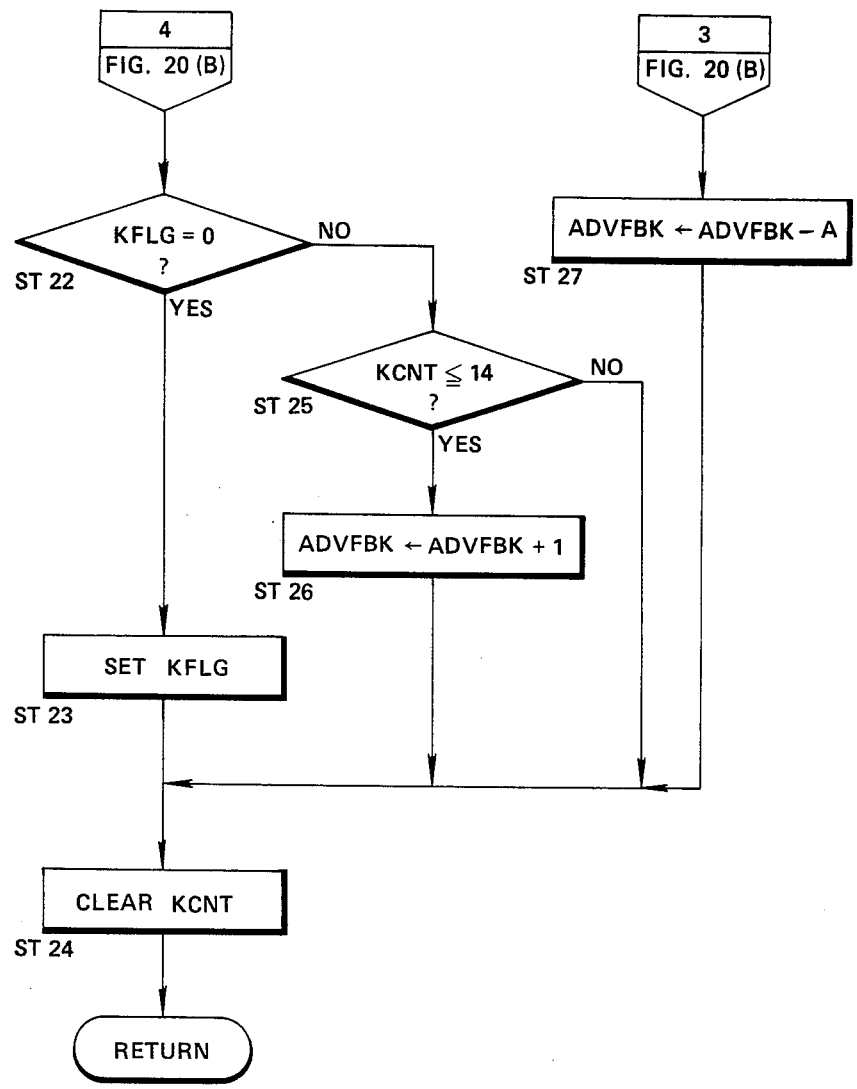
Figure 21:
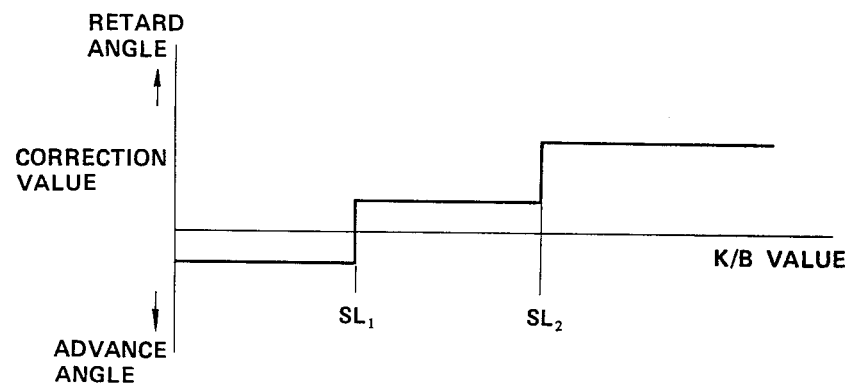
FIG. 21 is a graph representing the relationship between K/B value and the ignition timing correction for use in the flowcharts shown in FIG. 20.

The processing routine shown in FIGS. 20(A) through 20(C) starts in response to an external interrupt request in the form of the external interrupt request signal $S_{INT}$ from the second vibration energy detection circuit 34, as in the first embodiment.

In a first step ST1, the CPU 36 issues a command to the I/O Port 39 to start analog-to-digital conversion of the integration signal $S_6$ from the first vibration energy detection circuit 33 as in the first embodiment shown in FIG. 12(A).

In the next step ST2, the CPU 36 reads the first reference value $SL_1$ on the basis of the current engine revolution speed from the first reference table stored in the ROM 37. In the next step ST3, the CPU 36 reads the second reference value $SL_2$ on the basis of the current engine revolution speed from the second reference table stored in the ROM 37.

The current engine revolution speed is measured in the same way as described in the first preferred embodiment.

In the next step ST4, the CPU 36 waits for completion of the analog-to-digital conversion started in step ST1.

After the conversion has been completed, the routine goes to a step ST5, wherein the CPU 36 stores the digitalized value in a predetermined address of the RAM 38 as a quantity B associated with the vibration energy during the pre-ignition period.

In a step ST6, the CPU 36 issues a command to the I/O Port 39 to start the analog-to-digital conversion of the integration signal $S_7$ derived from the second vibration energy detection.

In the next step ST7, the CPU 36 determines whether the conversion started in the step ST6 is done. Once the conversion is completed, the CPU 36 stores the digitalized value in a predetermined address in the RAM 38 as a quantity associated with the vibration energy during the post-ignition period in a step ST8.

In the subsequent step ST9, the CPU 36 calculates the ratio K/B (or difference K−B) of the two quantities B and K so as to normalize the quantity K. The calculated ratio is referred to as the K/B value hereinafter as in the first preferred embodiment.

The above-described first and second reference values $SL_1$ and $SL_2$ will be described in detail. The cumulative percentile distributions of the K/B value shown in FIG. 13 are also used in this embodiment.

The first and second reference values $SL_1$ and $SL_2$ are set to the values shown in dotted lines in FIG. 13. The first reference value $SL_1$ is used to recognize the occurrence of knocking and the second reference value $SL_2$ is used to distinguish between light and severe levels of knocking.

For example, the frequency at which the K/B value exceeds the second reference value $SL_2$ is two or three percent in the case of light knocking, about twenty-five percent in the case of moderate knocking, and about seventy percent in the case of severe knocking. If the K/B value exceeds the second reference value $SL_2$, the CPU 36 recognizes knocking with an accuracy of nearly 100 percent (about 97–98%).

The relationship between the knocking power level and engine revolution speed has already been illustrated in FIG. 14.

In this embodiment, the first and second reference values $SL_1$, $SL_2$ are adjusted according to the engine speed so that a highly effective engine operation can be achieved.

It should be noted that either or both of the first and second reference values $SL_1$ and $SL_2$ may alternatively be fixed.

As shown in FIG. 20(B), in a step ST10, the K/B value calculated in the above-described step ST10 is compared with the second reference value $SL_2$ in order to recognize severe knocking. If $K/B > SL_2$, indicating moderate-to-severe knocking, the routine goes to the step ST27.

On the contrary, if $K/B \leq SL_2$, i.e., if knocking is weak or altogether absent, the routine goes to a step ST11 to determine whether the K/B value is greater than the first reference value $SL_1$, i.e., if $K/B > SL_1$. If $K/B > SL_1$, i.e., if relatively weak knocking occurs, the routine goes to a step ST22 to be described later.

On the other hand, if $K/B \leq SL_1$, i.e., if no knocking has occurred, the CPU 36 determines whether the flag KFLG is set to "0", the flag KFLG being set to "1" in a step ST23 when knocking of limitted intensity occurs, as described later.

If the flag KFLG is equal to "0" in the step ST12, i.e., if no knocking has occurred, the routine goes to steps ST13 through ST16 wherein the ignition timing is advanced by one degree if the inequality $K/B \leq SL_1$ is satisfied continuously for at least 28 cycles.

Specifically, in the step ST13, the count value BCNT is incremented by one (+1) and in the subsequent step ST14, the CPU 36 determines whether the count value BCNT exceeds 28 (BCNT > 28). If BCNT ≤ 28, the routine ends without further processing. However, if BCNT > 28 in the step ST14, the routine goes to the step ST15, wherein the correction ADVFBK is incremented by one (+1) so as to increment the ignition timing angle by one degree. Finally, the count value BCNT is cleared in the step ST16 (BCNT=0).

If the flag KFLG is not equal to "0" in the step ST12, i.e., if knocking has occurred previously the routine goes to steps ST17 through ST21, wherein the knocking state flag KFLG is reset to the non-knocking state if the inequality $KB \leq SL_1$ is satisfied continuously for at least 28 cycles.

Specifically, in the step ST17, the count value KCNT is incremented by one (+1). Thereafter, in the step ST18, the CPU 36 determines whether the count value CKNT exceeds 28 (KCNT > 28). If KCNT ≤ 28, the processing routine ends, whereas if KCNT > 28, the routine goes to a step ST19 wherein the flag KFLG is reset. In the subsequent step ST20, the count value KCNT is cleared (KCNT=0). In the subsequent step ST21, the count value BCNT is cleared and the processing routine then ends.

If $K/B > SL_1$ in step ST11, i.e., if relatively weak knocking occurs, the CPU 36 determines whether the flag KFLG is equal to "0" in the step ST22 in order to determine whether this is the first occurrence of knocking. If the flag KFLG is equal to "0", i.e., if this it the first occurrence of knocking, the routine goes to the subsequent step ST23, wherein the flag KFLG is set to "1" (KFLG=1). In the next step ST24, the count value KCNT is cleared (KCNT=0). The processing routine then ends.

If the flag KFLG is not equal to "0", i.e., if knocking has occurred previously, the routine goes to the step ST25, wherein the number (KCNT) of ignition cycles for which $K/B > SL_1$ is checked to see if KCNT ≤ 14, i.e., the CPU 36 determines whether or not the inequality $K/B < SL_1$ has been satisfied for 14 consecutive cycles. If KCNT > 14, the CPU 36 executes step 24 and the processing routine then ends. If KCNT ≤ 14, the routine goes to a step ST26, wherein the correction ADVFBK is decremented by one (−1) to retard the ignition timing by one degree. Thereafter, the routine goes to the step ST24 wherein the count value KCNT is cleared and thereafter the routine ends.

It should be noted that although the retardation to the ignition timing is set to one degree, any arbitrary value, for example, ¼ degrees or ½ degrees, may be used.

Adjusting the retardation on the basis of the magnitude of the K/B value in response to severe knocking allows quick suppresion of knocking without adversely affecting engine performance.

If $K/B > SL_2$ in the step ST10, i.e., if severe knocking occurs, the routine goes directly to a step ST27, wherein the correction ADVFBK is decremented by a predetermined amount A ($-A$) in order to retard the ignition timing by the angle A. Thereafter, the routine ends via the step ST24.

It should be noted that the predetermined amount A is a constant number set according to the engine model or engine operating condition and is larger than the retardation (one degree) used when light-to-moderate knocking occurs.

Following steps ST15, ST26, and ST27, the CPU 36 may be instructed to determine whether the correction ADVFBK exceeds a predetermined value in order to place a limitation on the value of the correction ADVFBK and so ensure that the ignition timing will not advanced or retarded excessively.

In this way, in the third preferred embodiment, the correction of the ignition timing is advanced by a predetermined angle when $K/B$ value $\leq SL_1$ (non-knocking) over a suitably prolonged interval, is retarded by a predetermined angle (one degree) when the expression $SL_1 < K/B \leq SL_2$ (relatively weak knocking) is satisfied for a predetermined number of cycles, and is immediately retarded by a larger predetermined angle (A degree) when $K/B > SL_2$ (relatively severe knocking).

Figure 22:
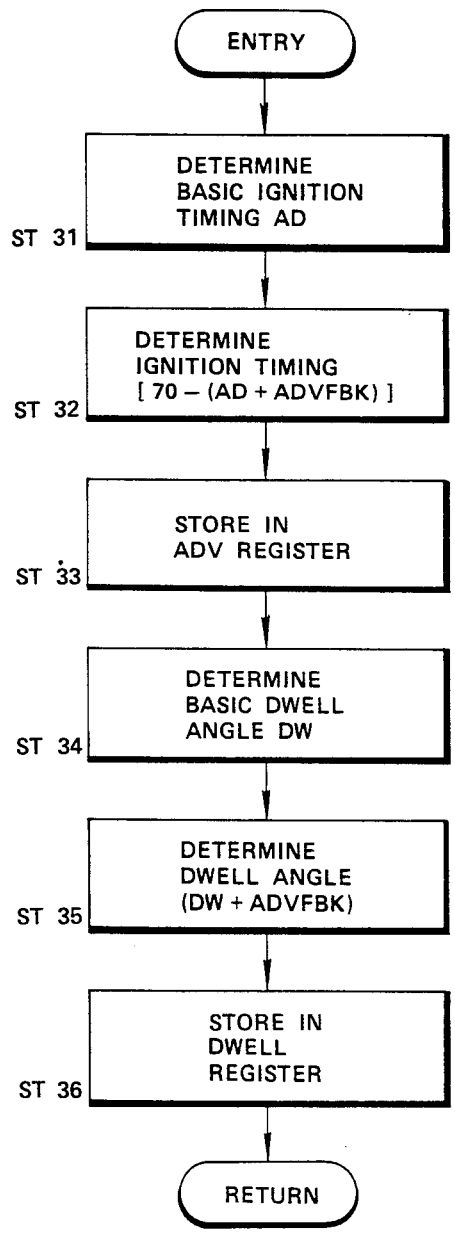
FIG. 22 is a processing flowchart for deriving ignition timing.

The processing routine shown in FIG. 22 starts when, for example, the reference signal $S_2$ is received from the crank angle sensor 13. The steps ST31 through ST36 are identical to the above-described STEPs 31 through 36 of FIG. 16 and so detailed explanation of the processing routine shown in FIG. 22 is omitted.

In the third embodiment, the system adjusts the correction to the ignition timing on the basis of the knocking intensity.

Although light, moderate and heavy degrees of knocking can be detected with high accuracy if the first reference value $SL_1$ is set as shown in FIG. 13, during trace knocking, the $K/B$ value may exceed the first reference value $SL_1$ about 10 percent of the time. Thus, if the ignition timing were controlled by retarding the timing whenever the $K/B$ value exceeds the first reference value $SL_1$, engine efficiency would drop since the retardation would occasionally occur unnecessarily during trace knocking. However, in this embodiment, knocking intensity is measured by the consistency of the $K/B$ value exceeding the first reference value $SL_1$ so as to neglect trace knocking and enable detection of light, moderate, and severe knocking ranges with high accuracy.

Figure 23A:
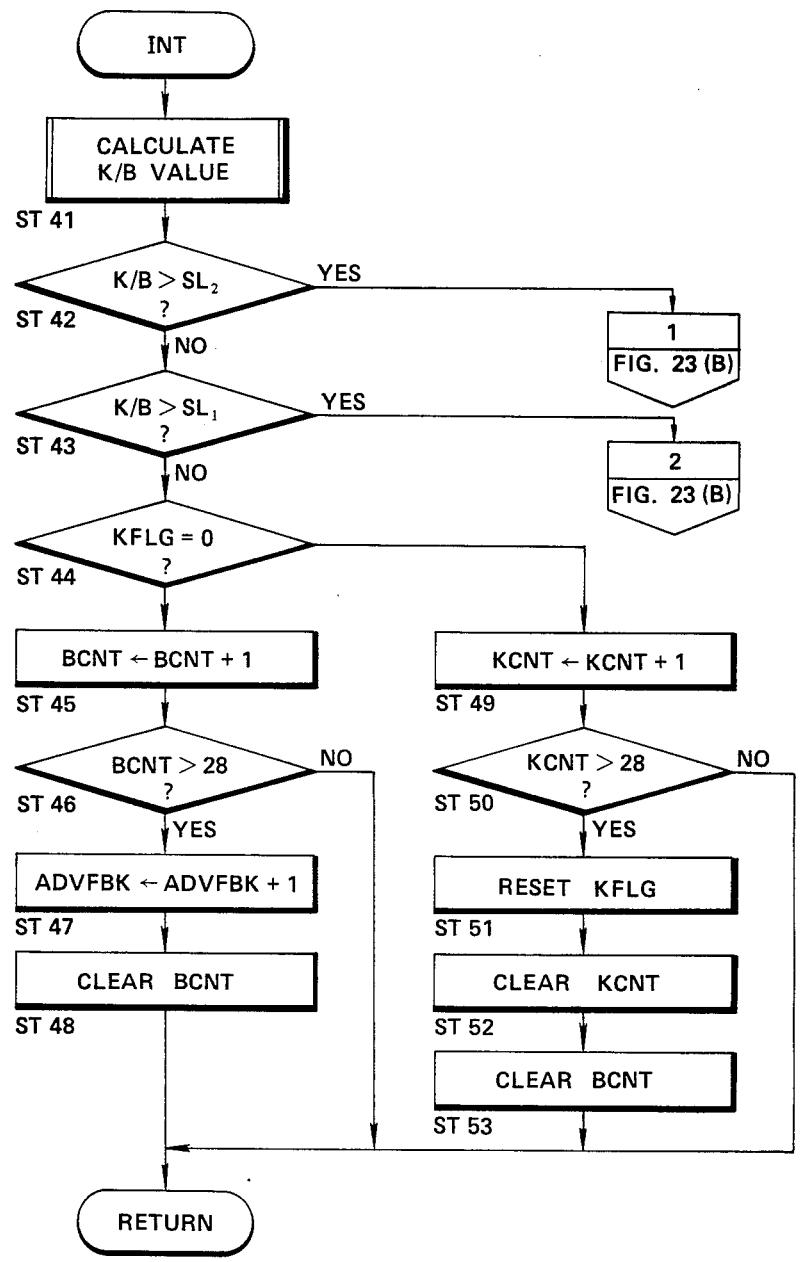
FIGS. 23(A) and 23(B) are a processing flowchart for detecting knocking and deriving the ignition timing correction in a fourth preferred embodiment.
Figure 23B:
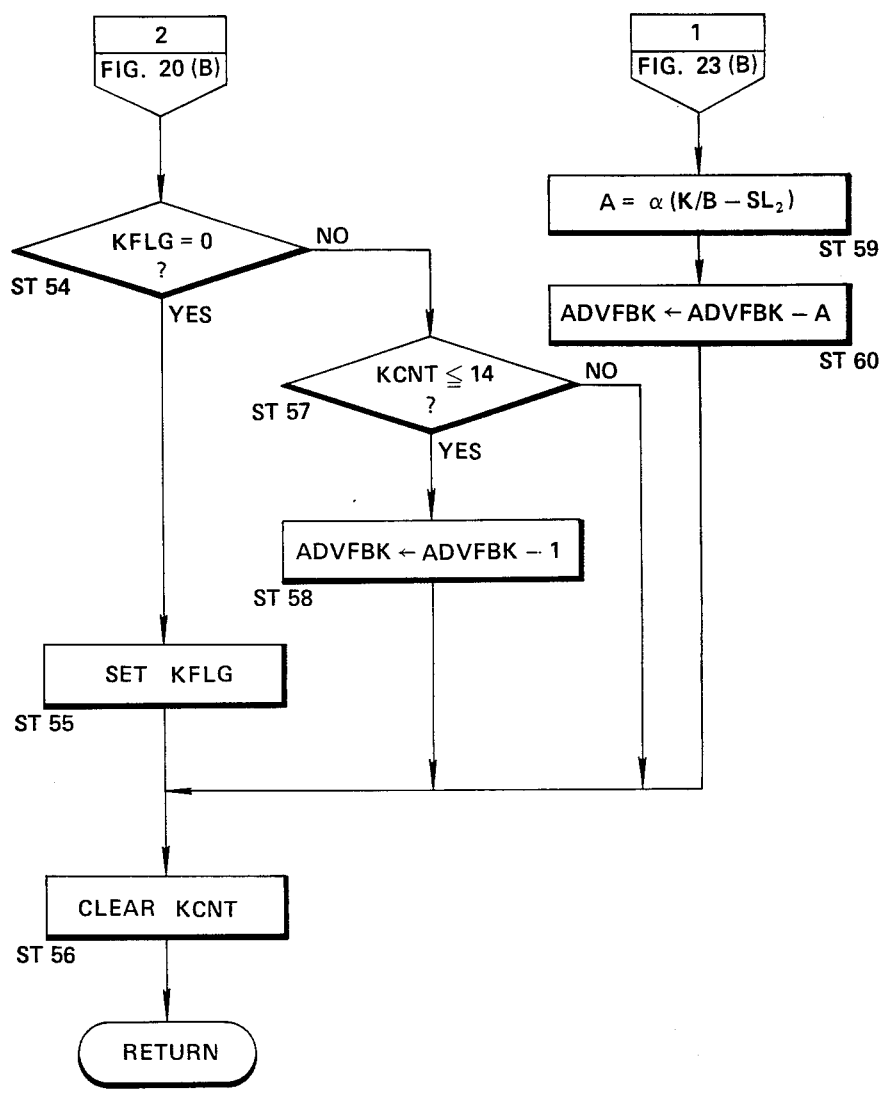

FIGS. 23(A) and 23(B) are a processing flowchart for detecting knocking and deriving a correction executed by the main control circuit of a fourth preferred embodiment.

In the fourth preferred embodiment, the CPU 36 of the main control circuit 35 calculates the $K/B$ value in a step ST41 shown in FIG. 23(A) as in the above steps ST1 through ST8. The CPU 36 determines whether $K/B > SL_2$ in a step ST42 in order to determine whether severe knocking has occurred. If $K/B \leq SL_2$, i.e., if no severe knocking has occurred, the routine goes to steps ST43 through ST53 which are identical to the steps ST11 through ST16 shown in FIGS. 20(B) and 20(C). Detailed description of thise steps will not be repeated.

If, on the other hand, $K/B > SL_2$, i.e., if severe knocking has occurred, the routine goes to a step 59 wherein the CPU 36 calculates the retardation A as follows $A = \alpha(K/B - SL_2)$. In the equation, $\alpha$ denotes a constant number predetermined for each engine model or a variable specified by engine operation conditions and the CPU 36 finds the value of $\alpha$ by means of the table lookup technique on the basis of the engine model or engine operating conditions.

Figure 24:
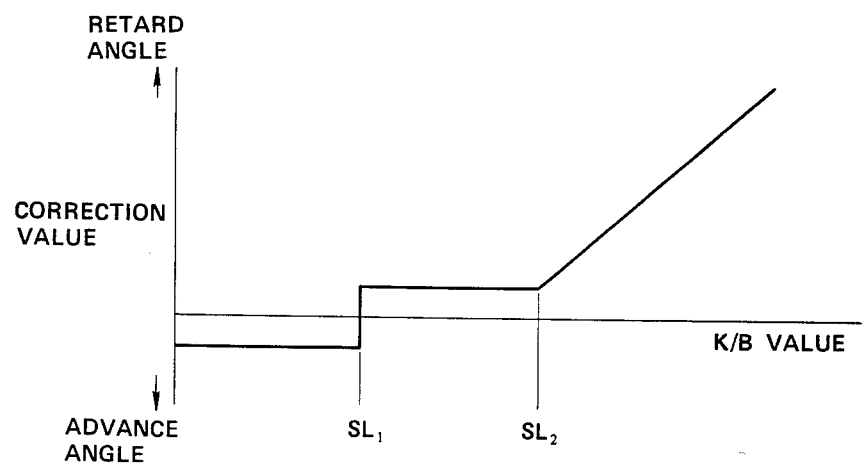
FIG. 24 is a graph of the relationship between K/B value and ignition timing correction for use in the flowcharts of FIGS. 23(A) and 23(B)

Thereafter the routine goes to the step ST60, wherein the correction value ADVFBK is decremented by the retardation A ($-A$) so as to retard the ignition timing by the retardation A. That is to say, in the fourth preferred embodiment, when severe knocking occurs, the retardation is increased as the severity of knocking, i.e., as the $K/B$ value increases, as shown in FIG. 24.

Therefore, the retardation is optimized for the current degree of knocking and highly accurate and quick control can be achieved.

Figure 25A:
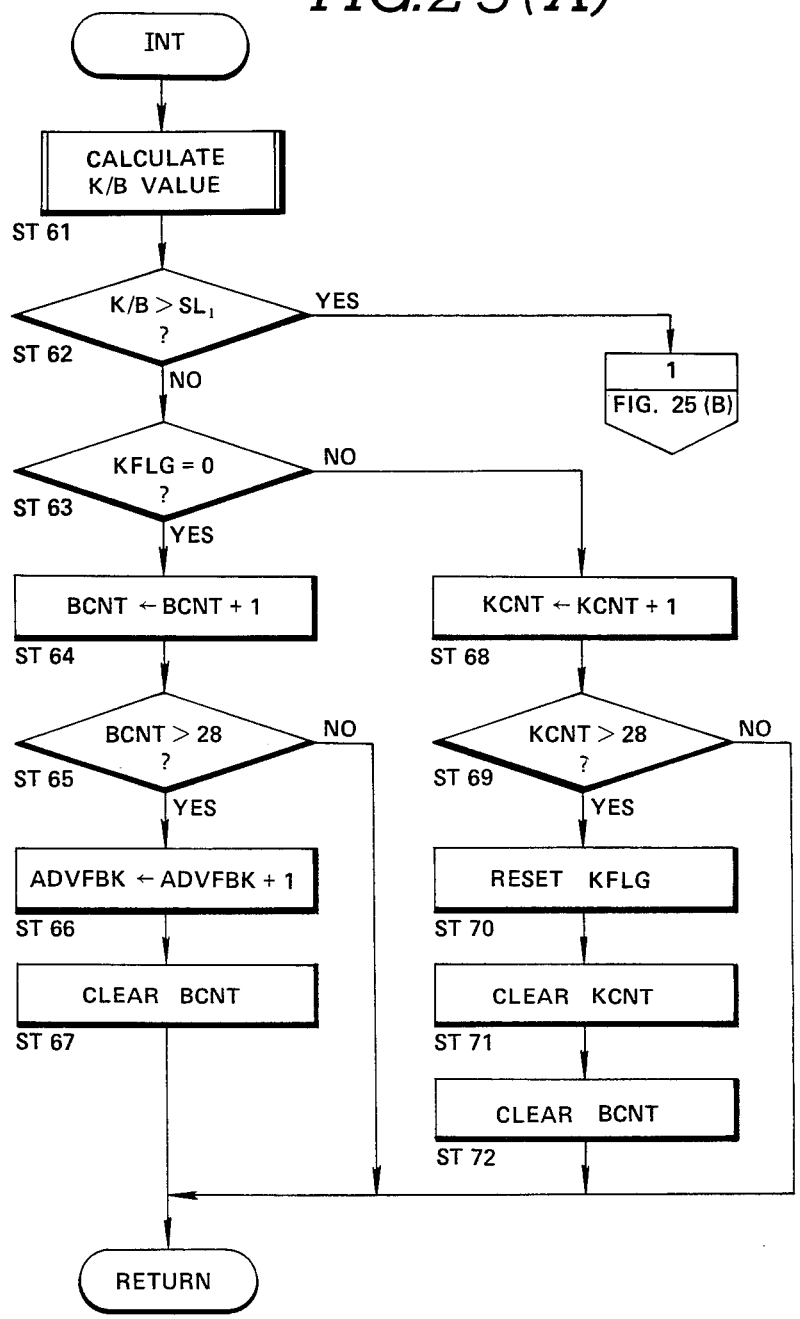
FIGS. 25(A) and 25(B) are processing flowcharts for detecting knocking and deriving the ignition timing correction in a fifth preferred embodiment.
Figure 25B:
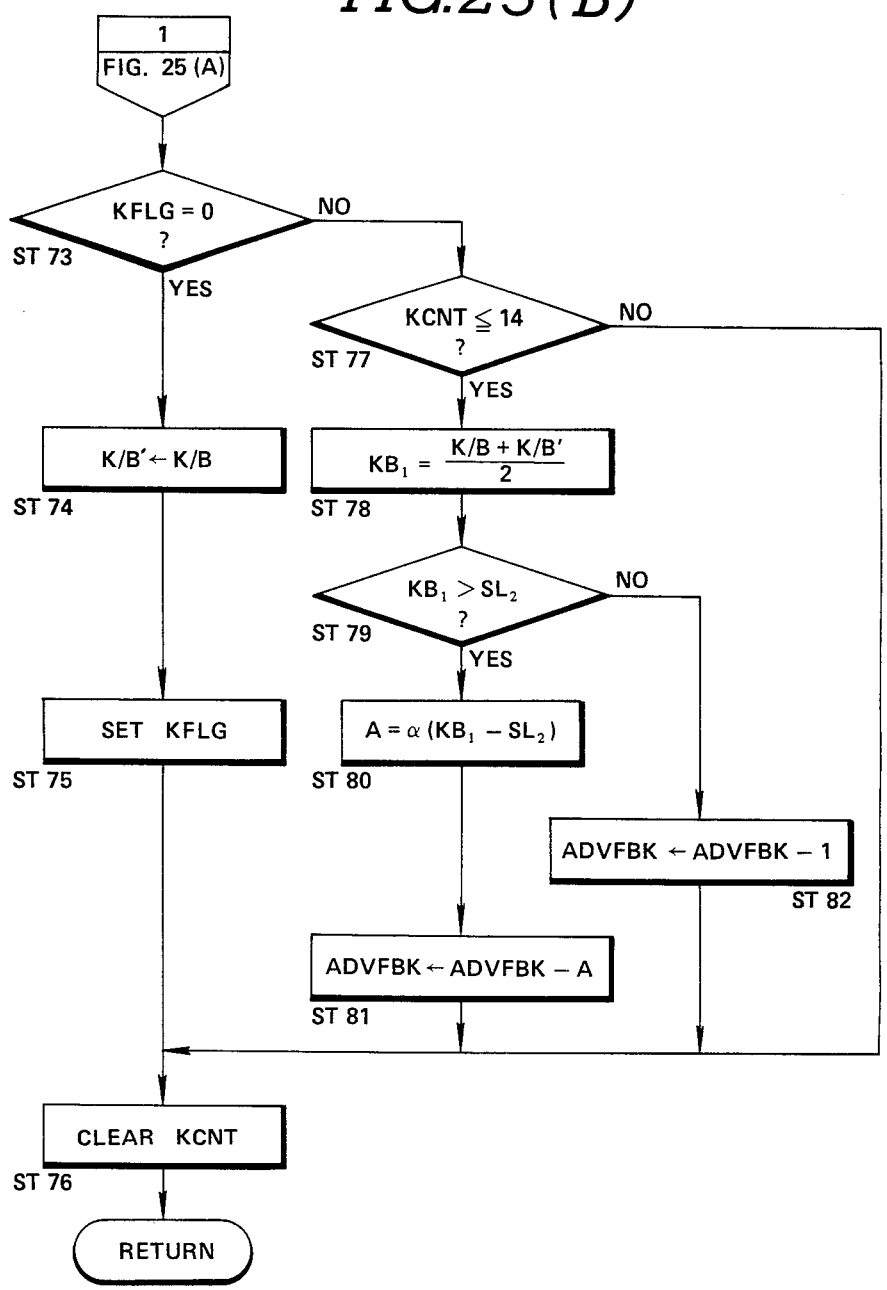

FIGS. 25(A) and 25(B) are a processing flowchart for detecting knocking and deriving the correction to ignition timing in a fifth preferred embodiment.

As shown in FIG. 25(A), the CPU 36 calculates the $K/B$ value in a first step ST61 in the same way as described above.

In the subsequent step ST62, the CPU 36 determines whether $K/B > SL_1$, i.e., whether knocking has occurred. If $K/B < SL_1$, i.e. if no knocking has occurred, the routine goes to steps ST63 through ST72, which are identical to the steps ST12 through ST21 shown in FIGS. 20(A) and 20(B).

If, the other hand, $K/B > SL_1$, i.e., if knocking has occurred, the routine goes to a step ST73, wherein the CPU 36 determines whether the flag KFLG is equal to "0". If the flag KFLG is equal to "0", i.e., if this is the first occurrence of knocking, the routine goes to a step ST74 wherein the present $K/B$ value is stored into a predetermined address of the RAM 38 as a $K/B'$ value. In the next steps ST75 and ST76, the flag KFLG is set to "1" and the count value KCNT is cleared, and then the routine ends.

If the flag KFLG is not equal to "0" in step ST73, i.e., if knocking has occurred previously, the routine goes to a step ST77, wherein the CPU 36 determines whether count value KCNT $\leq 14$ (refer to the step ST25 in FIG. 20(B)). If KCNT $> 14$, the routine goes to the step ST76 and the routine then ends.

If KCNT $\geq 14$ at step ST77, the routine goes to a step ST78, wherein the CPU 36 calculates a value $KB_1$ as follows: $KB_1 = (K/B + K/B')/2$, so that $KB_1$ is the average of the last two $K/B$ values. In subsequent step ST79, the newly derived $KB_1$ value is compared with the severe knocking threshold $SL_2$.

If $KB_1 > SL_2$, i.e., if severe knocking has occurred, the routine goes to a step ST80, wherein the retardation A is calculated as follows: $A = \alpha(KB_1 - SL_2)$, wherein $\alpha$ is as described in the fourth preferred embodiment.

Thereafter, the routine goes to a step ST81, wherein the correction ADVFBK is decremented by the retardation A ($-A$) so as to retard te ignition timing A degrees. The program then ends via step ST76.

If, on the other hand, $KB_1 \leq SL_2$, i.e., if no severe knocking has occurred, the routine goes to a step ST82, wherein the correction ADVFBK is decremented by one ($-1$) so as to retard the ignition timing one degree.

In this embodiment as in the others, ignition timing is retarded to a variable extent related to knocking intensity when knocking is especially severe. The averaging process at step ST78 helps further mask the misleading effect of "noise" is the $K/B$ value.

It will be fully understood by those skilled in the art that the foregoing description is made in terms of preferred embodiments and various changes and modifications may be made without departing from the scope of the present invention, which is defined by the appended claims.

What is claimed is:

1. A system for controlling ignition timing for an internal combustion engine, comprising:
   (a) first means, including a sensor for detecting a pressure in an engine cylinder of the engine and outputting a signal indicative thereof, for detecting the occurrence of an engine knocking on the basis of the signal outputted by said sensor;
   (b) second means for measuring the intensity of the knocking, the occurrence thereof being detected by said first means, said second means measuring the intensity of the knocking on the basis of a difference between correlated values of combustion vibration energies when knocking occurs and when knocking does not occur, the correlated values being derived from the output signal of the pressure sensor of the first means; and
   (c) third means for retarding an ignition advance angle according to the intensity of engine knocking measured by said second means.

2. The system according to claim 1, wherein said third means retards the ignition advance angle value by a retardation angle value of which varies in accordance with the measured knocking intensity.

3. The system according to claim 2, wherein said retardation angle value increases with the measured knocking intensity.

4. The system according to claim 3, wherein the retardation angle value increases in proportion to the measured knocking intensity.

5. The system according to claim 3, wherein the retardation angle value increases stepwise with the measured knocking intensity.

6. The system according to claim 1, wherein said third means retards the ignition advance angle value in accordance with the measured knocking intensity and other measured engine operating conditions.

7. The system according to claim 1, wherein said third means retards the ignition advance angle at a frequency which is determined according to the frequency of detection of occurrences of knocking.

8. The system according to claim 1, wherein said second means further comprises fourth means for determining whether the measured intensity of knocking exceeds a reference value and said third means retards the ignition advance angle value by one of two retardation angle values depending on whether the measured intensity of knocking exceeds the reference value.

9. The system according to claim 8, wherein when said fourth means determines that the measured intensity of knocking does not exceed the reference value said retardation angle value is smaller than when said fourth means determines that the measured intensity of knocking exceeds the reference value.

10. The system according to claim 8, wherein the retardation angle value increases in proportion to the measured knocking intensity when said fourth means determines that the measured intensity of the engine knocking exceeds the reference value.

11. The system according to claim 8, wherein the retardation angle value increases stepwise as the measured intensity of engine knocking increases when said fourth means determines that the measured intensity of engine knocking exceeds the reference value.

12. The system according to claim 8, wherein said third means retards the ignition advance angle value by the retardation angle value at a frequency determined according to the frequency of detection of occurrence of knocking when said fourth means determines that the measured intensity of engine knocking does not exceed the reference value.

13. A method for controlling ignition timing for an internal combustion engine, comprising the steps of:
   (a) detecting a pressure in an engine cylinder and outputting a signal indicative thereof with a sensor;
   (b) monitoring an occurrence of the engine knocking on the basis of the signal outputted by the sensor;
   (c) measuring an intensity of engine knocking on the basis of a difference between corrected values of combustion vibration energies when the knocking occurs and when the knocking does not occur, the correlated values being derived from the output signal of the sensor; and
   (d) retarding an ignition advance angle according to the intensity of engine knocking measured in the step (c) with a control unit.

* * * * *